(12) United States Patent
Jordan et al.

(10) Patent No.: US 11,634,368 B2
(45) Date of Patent: Apr. 25, 2023

(54) AGRICULTURAL COMPOSITIONS

(71) Applicant: JRX Biotechnology, Inc., Newport Beach, CA (US)

(72) Inventors: Christopher S. Jordan, Santa Ana, CA (US); Frederick L. Jordan, Santa Ana, CA (US)

(73) Assignee: JRX Biotechnology, Inc., Orange, CA (US)

( * ) Notice: Subject to any disclaimer, the term of this patent is extended or adjusted under 35 U.S.C. 154(b) by 0 days.

(21) Appl. No.: 17/042,648

(22) PCT Filed: Mar. 28, 2019

(86) PCT No.: PCT/US2019/024646
§ 371 (c)(1),
(2) Date: Sep. 28, 2020

(87) PCT Pub. No.: WO2019/191471
PCT Pub. Date: Oct. 3, 2019

(65) Prior Publication Data
US 2021/0032177 A1 Feb. 4, 2021

Related U.S. Application Data

(60) Provisional application No. 62/649,565, filed on Mar. 28, 2018.

(51) Int. Cl.
| | | |
|---|---|---|
| C05G 3/50 | (2020.01) | |
| C05G 5/23 | (2020.01) | |
| C05G 3/80 | (2020.01) | |
| C05F 11/08 | (2006.01) | |
| C05G 5/20 | (2020.01) | |

(52) U.S. Cl.
CPC .............. *C05G 3/50* (2020.02); *C05F 11/08* (2013.01); *C05G 3/80* (2020.02); *C05G 5/20* (2020.02); *C05G 5/23* (2020.02)

(58) Field of Classification Search
None
See application file for complete search history.

(56) References Cited

U.S. PATENT DOCUMENTS

| | | | |
|---|---|---|---|
| 3,288,824 A | 11/1966 | Mahler et al. | |
| 4,870,103 A | 9/1989 | Hoechst | |
| 5,314,506 A | 5/1994 | Midler et al. | |
| 6,274,570 B1 | 8/2001 | Vogt et al. | |
| 6,302,958 B1 | 10/2001 | Lindrud et al. | |
| 6,432,884 B1 | 8/2002 | Lachut | |
| 7,399,730 B2 | 7/2008 | Kostka et al. | |
| 7,815,807 B2 | 10/2010 | Bassett | |
| 9,131,679 B2 | 9/2015 | Di Modugno et al. | |
| 9,403,132 B2 | 8/2016 | Hata | |
| 9,796,896 B2* | 10/2017 | Lynch | C05F 11/00 |
| 10,624,352 B2* | 4/2020 | Radhakrishnan | A01N 43/90 |
| 2002/0045549 A1 | 4/2002 | Kruger et al. | |
| 2008/0154210 A1 | 6/2008 | Jordan et al. | |
| 2009/0081292 A1* | 3/2009 | Otomo | C10L 5/00 424/484 |
| 2010/0099717 A1 | 4/2010 | Vermeer et al. | |
| 2011/0177948 A1 | 7/2011 | Vermeer et al. | |
| 2012/0315308 A1 | 12/2012 | Travers | |
| 2013/0150240 A1 | 6/2013 | Newman et al. | |
| 2015/0374835 A1* | 12/2015 | Jordan | A61K 31/616 514/629 |
| 2018/0251776 A1* | 9/2018 | Riley | C05F 11/08 |
| 2019/0048307 A1* | 2/2019 | Morash | A23K 10/38 |
| 2020/0022364 A1 | 1/2020 | Jordan et al. | |

FOREIGN PATENT DOCUMENTS

| | | |
|---|---|---|
| CN | 1337888 | 2/2002 |
| CN | 103282052 | 9/2013 |
| CN | 103596421 | 2/2014 |
| CN | 105125426 | 12/2015 |
| EP | 0244754 | 11/1987 |
| JP | 2010-075089 | 4/2010 |
| JP | 2014-510742 | 5/2014 |

(Continued)

OTHER PUBLICATIONS

Alanwood.net [online], "Compendium of Pesticide Common Names: Index of Common Names," available on or before Jun. 20, 2002, via Internet Archive: Wayback Machine URL<https://web.archive.org/web/20020620134924/http://alanwood.net/pesticides/index_cn_frame.html>, retrieved on Mar. 5, 2021, retrieved from URL<http://alanwood.net/pesticides/index_cn_frame.html>, 1 page.

Bunderson et al., "Tools for Evaluating Native Grasses as Low Maintenance Turf," HortTech., 19(3):626-32, Jan. 2009.

Carrow and Duncan, "Improving Drought Resistance and Persistence in Turf-Type Tall Fescue," Crop Sci., 43(3):978-84, May 2003.

Chaichi et al., "Surfactant application on yield and irrigation water use efficiency in corn under limited irrigation," Crop Science, 55(1):386-93, 2015.

(Continued)

*Primary Examiner* — Wayne A Langel

(74) *Attorney, Agent, or Firm* — Fish & Richardson P.C.

(57) ABSTRACT

This document provides compositions comprising (or consisting essentially of or consisting of) one or more water-soluble oils selected from the group consisting of ethoxylated macadamia oil, ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry, or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and one or more agricultural chemical or biological agents. Methods for making and using the compositions also are provided.

9 Claims, No Drawings

(56) References Cited

FOREIGN PATENT DOCUMENTS

| WO | WO 2012/167091 | 6/2012 |
|---|---|---|
| WO | WO 2014/090988 | 6/2014 |

OTHER PUBLICATIONS

Chemistry and Technology of Agrochemical Formulations, 1st ed., Knowles (ed.), 1998, 483 pages.

Cox et al., "Macadamia Husk Compost Improves Soil Health in Sub-Tropical Horticulture," Presented at Proceedings of the 3rd Australian New Zealand Soils Conference, Sydney, Australia, Dec. 5-9, 2004, 8 pages.

Da Silva et al., "Oil-in-water biocompatibie microemulsion as a carrier for the antitumor drag compound methyl dihydrojasmonate," International Journal of Nanomedicine, 10:585, 2015.

Dadresan et al., "Effect of salinity stress and surfactant treatment on physiological traits and nutrient absorption of fenugreek plant," Communications in Soil Science and Plant Analysis, 46(22):2807-20, Dec. 2015.

De Lucas et al., "Influence of Operation Variables on Quality Parameters of Olive Husk Oil Extracted with C02: Three-Step Sequential Extraction," J. Am. Oil Chem. Society, Feb. 2003, 80(2):181-188.

FAO.org[online], "2050: A third more mouths to feed" Sep. 23, 2009, retrieved on Aug. 28, 2019, retrived from URL <http://www.fao.org/news/story/en/item/35571/icode/>, 4 pages.

FloraTech, "Formulation Guide: A quantitative comparison of 17 common PEG ingredients' relative attributes," dated May 31, 2009, 12 pages.

Fungicide Resistance Action Committee, "FRAC Code List 2018: Fungicides Sorted by Mode of Action (including FRAC Code numbering)," dated Feb. 2018, 14 pages.

Gupta et al., "Preparation of prospective plant oil derived microemulsion vehicles for drug delivery," Indian Journal of Biochemistry & Biophysics, 43:254-57, Aug. 2006.

Hanisco, "Reduce waste with a quality surfactant program," Greenhouse Product News, Jan. 2015, 3 pages.

hrcaglobal.com [online], "Global Herbicide Classification Lookup," available on or before Aug. 30. 2016, via Internet Archive: Wayback Machine URL<https://web.archive.org/web/20160830025851/http://hracglobal.com/tools/classification-lookup>, retrieved on Mar. 5, 2021, retrieved from URL<http://hracglobal.com/tools/classification-lookup>, 2 pages.

Karcher and Richardson, "Quantifying Turfgrass Color Using Digital Image Analysis," Crop Sci., 43(3):943-51, Jun. 2003.

Karcher and Richardson, "Digital image analysis in turfgrass research," Argonomy Monograph, 1133-49, 2013.

MarvelOils.com [online], "Macadamia Oil Benefits. Uses, Recipes," available on or before Sep. 19, 2014 via Internet Archive: Wayback Machine URL<https://web.archive.org/web/20140919153023/www.marveloils.com/browse-by-oil/macadamia-oil/>, retrieved on Mar. 5, 2021, retrieved from URL<https://www.marveloils.com/browse-by-oil/macadamia-oil/>, 4 pages.

Mittal, "Determination of CMC of polysorbate 20 in aqueous solution by surface tension method," Journal of Pharmaceutical Sciences, 61(8):1334-5, Aug. 1972.

Narang et al., "Stable drug encapsulation in micelles and microemulsion," Int. J. Pharm., 345(1-2):9-25, Dec. 2007.

PCT International Preliminary Report on Patentability in International Appln. No. PCT/US2019/024646, dated Sep. 29, 2020, 6 pages.

PCT International Search Report and Written Opinion in International Appln. No. PCT/US2019/024646, dated Jun. 24, 2019, 8 pages.

Richardson et al., "Quantifying Turfgrass Cover Using Digital Image Analysis," Crop Sci., 41(6):1884-8, Nov. 2001.

Schiavon et al., "Bermudagrass and Seashore Paspalum Establishment from Seed Using Differing Irrigation Methods and Water Qualities," Agron. J., 104(3):706-14, May 2012.

Scotts, "Aqua-Grol L with PsiMatric Technology: Liquid Formulation," dated Oct. 30, 200, 3 pages.

Shaikh and Kumbharkhane, "Dielectric relaxation studies of aqueous solution of polyethylene glycol 200 (PEG200), using time-domain reflectometry," Physics and Chemistry of Liquids, 53(5):627-37, Sep. 2015.

Shaver et al., "Dormant Seeding Bermudagrass Cultivars in a Transition-Zone Environment," Crop Sci., 46(4):1787-92, Jul. 2006.

Singla and Patanjali, "Phase behaviour of neem oil based microemulsion formulations," Industrial Crops and Products, 44:421-6, Jan. 2013.

Sorochan et al., "Segway and Golf Car Wear on Bermudagrass Fairway Turf," Appl. Turfgrass Sci., 3(1):63-70, Jul. 2006.

Sparks et al., "IRAC: Mode of Action Classification and Insecticide Resistance Management," Pestic. Biochem. Physiology, Jun. 2015, 121:122-128.

Syngenta, "Safety Data Sheet: Quadris," dated Sep. 6, 2004, 20 pages (with Machine English Translation).

Warisnoicharoen et al., "Nonionic oil-in-water microemulsions: the effect of oil type on phase behaviour," International Journal of Pharmaceutics, 198(1):7-27, Mar. 2000.

Yang, "Effects of a nonionic surfactant on plant growth and physiology," PhD diss., 2008.

Polychniatou et al., "Olive oil microemulsions and study of the emulsifying ability of olive oil endogenous components," Int. Congr. Eng. Food, 2011, vol. 11, 5 pages.

Bethke, "Aquatrols AquaGro with PsiMatric Technology," Aquatrols, Jun. 2012, 1 page.

Bethke, "Influence of Aquatrols AquaGro L with PsiMatric™ Technology on Water Management and Crop Growth," Aquatrols, Jan. 1999, 2 pages.

Falk et al., "Surfactant-Induced Phytotoxicity," Weed Technology, Jul. 1994, 8:519-525.

No Author, "Final Report on the Safety Assessment of PEG (Polyethylene Glysol)-2, -4, -6, -8, -12, -20, -32, -75, and -150 Dilaurate; PEG-2, -4, -6, -8, -9, -10, -12, -14, -20, -32, -75, -150, and -200 Laurate; and PEG-2 Laurate SE1," International Journal of Toxicology, Jan. 2000, 19(Suppl. 2):29-41.

Yalabik-Kas et al., "Some Properties of an Ethoxylated Castor Oil and Ethoxylaged Oleyl Alcohol," Journal Drug Development and Industrial Pharmacy, Jan. 20, 1982, 8(3):383-396.

U.S. Appl. No. 16/338,404, filed Mar. 28, 2019, Frederick L. Jordan, Pending.

* cited by examiner

AGRICULTURAL COMPOSITIONS

CROSS-REFERENCE TO RELATED APPLICATIONS

This application is a National Stage application under 35 U.S.C. § 371 of International Application No. PCT/US2019/024646, having an International Filing Date of Mar. 28, 2019, which claims priority to U.S. Application Serial No. 62/649,565, filed on Mar. 28, 2018. The disclosure of the prior application is considered part of the disclosure of this application, and is incorporated in its entirety into this application.

TECHNICAL FIELD

This document relates to agricultural compositions. For example, this document provides agricultural compositions comprising one or more water-soluble oils and one or more agricultural chemicals (e.g., pesticides and/or fertilizers) and/or biological agents (e.g., microbials such as bacteria, fungi, viruses). This document also provides methods and materials for making and using such agricultural compositions.

BACKGROUND

Agricultural compositions comprising agricultural chemical and/or biological agent active ingredients, including those found in fertilizers, insecticides, fungicides, biofungicides, herbicides, miticides, and plant growth regulators, can be incorporated into a finished formulation before being applied to soil or growth medium, plants, plant parts, and/or seeds. Diluents and/or additives can be chosen according to the chemical properties and end-use applications of the agricultural compositions. For example, various materials are used in formulations to optimally dilute, formulate, and/or solubilize such active ingredients and improve the properties of the finished formulation, such as for example: storage stability, ease of handling, enhanced penetration into the soil, plant, pest (e.g., insect), or seed, an improved safety profile of the active ingredient, or improved active ingredient efficacy against target organisms.

SUMMARY

Provided herein are agricultural compositions comprising one or more water-soluble oils selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry, or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and one or more agricultural chemicals and/or biological agents selected from a fertilizer, pesticide, insecticide, acaricide, nematicide, fungicide, biofungicide, bactericide, herbicide, plant growth regulator, biostimulant, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, a colorant, and combinations thereof. In some embodiments, one or more biological agents can comprise one or more strains of microbes (e.g., fungi, yeast, bacteria, viruses). In some embodiments, the bacteria can act as a biopesticide, a biofungicide, a plant growth regulator, a biostimulant, a fertilizer, or a combination thereof. This document also provides methods and materials for making and using such agricultural compositions.

The compositions and methods provided herein are based, at least in part, on the discovery that certain water-soluble oils can enhance or increase the absorption, uptake, use efficiency, safety, stability, and/or efficacy of agricultural chemicals and/or biological agents such as pesticides and fertilizers in plants, plant parts, and/or seeds. The compositions and methods provided herein are also based, at least in part, on the discovery that certain water-soluble oils can promote or support the colonization, growth and/or multiplication of beneficial microbes (e.g., fungi, yeast, bacteria, viruses) in soil or other growth medium, thereby promoting and/or supporting healthy plant growth.

The compositions and methods described herein can provide several advantages. First, applying a composition provided herein to plants, plant parts, or seeds according to a method described herein can lead to increased absorption, uptake, or stability of the agricultural chemical and/or biological agent included in the composition (e.g., a pesticide and/or a fertilizer) in the treated plants, plant parts, or seeds. In some cases, increasing the colonization or stability of microbes in the soil (either native microbes or externally applied, isolated microbes) by methods described herein can increase the efficacy of such microbes to fight disease, suppress insect pests, or fixate a fertilizer, like nitrogen in the soil. In some cases, increasing absorption of, e.g., fertilizers by the methods described herein can correct nutrient deficiencies in the plants, plant parts, or seeds. In some cases, increasing, e.g., pesticide uptake in the plants, plant parts, or seeds can increase the efficacy of the pesticide. In some cases, increasing absorption of the agricultural chemical and/or biological agent included in the composition can allow decreased application of an agricultural chemical, including, but not limited to, a decrease in the effective concentration of the agricultural chemical in a composition comprising a water-soluble oil as described herein as compared to the effective concentration of the agricultural chemical applied without such water-soluble oil, a decrease in the frequency of application of the agricultural chemical in a composition comprising a water-soluble oil as described herein as compared to the frequency of application of the agricultural chemical applied without such water-soluble oil, and the like.

Second, applying a composition provided herein according to a method described herein can, in some cases, lead to increased absorption or uptake of essential plant nutrients. Essential plant nutrients keep plants healthy, protect plants from disease, and aid in plant reproduction and growth. In some cases, application of a water-soluble or water-miscible oil as provided herein can increase, directly or indirectly, plant uptake of a nutrient or fertilizer such as nitrogen. In some cases, such increased uptake of a particular nutrient can be accomplished without addition of the particular nutrient, and instead can result organically from the promotion of the growth of beneficial microbes in the soil or growth medium. In some cases, application of a water-soluble or water-miscible oil as provided herein can provide fertilization without added fertilizer, or with less fertilizer than traditionally used for the particular plant and growth conditions, and/or can increase microbial biomass or colonization in the soil or growth medium.

Third, applying a composition provided herein according to a method described herein can, in some cases, lead to increased yield in the plants.

In a first general aspect, this document provides a composition comprising a water-soluble oil selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry, or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and one or more agricultural chemicals and/or biological agents selected from the group consisting of a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof.

In a second general aspect, this document provides a method of increasing the effectiveness of an agricultural chemical and/or biological agent in soil, in a growth medium, in a soil amendment, or on a plant, plant part, or seed, comprising contacting the soil, growth medium, soil amendment, plant, plant part, or seed with a water-soluble oil selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry, or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and an agricultural chemical and/or biological agent selected from a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof, wherein the soil, growth medium, soil amendment, plant, plant part, or seed displays increased effectiveness of the agricultural chemical as compared to a soil, growth medium, soil amendment, plant, plant part, or seed that was contacted with the agricultural chemical and/or biological agent and was not contacted with the water-soluble oil described herein.

In a third general aspect, this document provides a method of increasing the absorption or uptake of an agricultural chemical in a soil, growth medium, soil amendment, or into a plant, plant part, or seed, comprising contacting the soil, growth medium, soil amendment, plant, plant part, or seed with a water-soluble oil selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry, or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and an agricultural chemical and/or biological agent selected from a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof, wherein the soil, growth medium, soil amendment, plant, plant part, or seed displays increased absorption of the agricultural chemical as compared to a soil, growth medium, soil amendment, plant, plant part, or seed that was contacted with the agricultural chemical and/or biological agent and was not contacted with the water-soluble oil described herein.

In a fourth general aspect, this document provides a method of treating soil, growth medium, soil amendment, plants, plant parts, or seeds, comprising contacting the soil, growth medium, soil amendment, plants, plant parts, or seeds with an effective amount of any one of the compositions described herein.

In a fifth general aspect, this document provides a method of treating a seed, comprising coating a seed with an effective amount of any one of the compositions described herein.

In a sixth general aspect, this document provides a method of making any one of the compositions described herein, comprising adding one or more water-soluble oil and one or more agricultural chemical and/or biological agents to water; and mixing the composition to form a homogenous solution.

In a seventh general aspect, this document provides a method of reducing the application concentration, application rate, and/or application frequency of an agricultural chemical to a soil, growth medium, soil amendment, plant, plant part, or seed, comprising contacting the soil, growth medium, soil amendment, plant, plant part, or seed with a water-soluble oil selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry, or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and an agricultural chemical and/or biological agent selected from a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof, wherein the soil, growth medium, soil amendment, plant, plant part, or seed displays an equivalent or enhanced effective response to the agricultural chemical as compared to a soil, growth medium, soil amendment, plant, plant part, or seed that was contacted with the same or higher concentration of the agricultural chemical and/or biological agent and was not contacted with one or more water-soluble oils described herein.

In an eighth general aspect, this document provides a method of treating a soil or growth medium, comprising contacting the soil or growth medium with an effective amount of a water-soluble oil selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry, or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and an agricultural chemical and/or biological agent selected from a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof.

Unless otherwise defined, all technical and scientific terms used herein have the same meaning as commonly understood by one of ordinary skill in the art to which the present application pertains. Methods and materials are described herein for use in the present application; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the present application will be apparent from the following detailed description and figures, and from the claims.

DETAILED DESCRIPTION

The term "agricultural plant" or "plant" as used herein is intended to mean any whole plant or cultivar that is grown, cultivated, and/or managed by humans including, but not limited to, plants, bulbs, varieties, strains or races of plants consumed by humans, pets, domestic animals, livestock, farm-raised saltwater and freshwater fish, shrimp, and prawns, plants used to produce, or as a source of, fiber, pharmaceuticals, cosmetics, nutritional supplements, wine, and essential oils, tobacco, marijuana, forest trees, and plants grown by man for aesthetic purposes, such as houseplants, flowers, cut flowers, ornamentals, annuals, perennials, mums, asters, Christmas trees, bedding plants, turfgrasses, ground covers, grasses, shrubs, or shade trees.

As used herein, "plant parts" refers to any part or parts of a whole plant or cultivar including, but not limited to, leaves, flowers, shoots, stems, branches, fruits, vegetables, pods, kernels, seeds, nuts, beans, tubers, ears, cobs, husks, stalks, roots, root tips, anthers, plant cells, plant protoplasts, plant cell tissue cultures from which plants can be regenerated, plant calli, plant clumps, and/or plant cells that are intact in plants or parts of plants such as embryos, pollen, ovules, seeds, nuts, leaves, flowers, shoots, stems, branches, fruits, vegetables, pods, kernels, beans, tubers, ears, cobs, husks, stalks, roots or root tips and the like.

As used herein, the term "cultivar" refers to a variety, strain, or race of plant that has been produced by horticultural or agronomic techniques and is not normally found in wild populations.

As used herein, an "agricultural chemical" is any naturally occurring or synthetic chemical or any component or mixture thereof that is used in a chemical composition including, but not limited to, fertilizers, pesticides, insecticides, acaricides, nematicides, fungicides, biofungicides, bactericides, herbicides, plant growth regulators, biostimulants, biopesticides, nutrients, drift reduction agents, utility adjuvants, water conditioners, penetrants, pH buffers, activators, surfactants, stabilizers, preservatives, stickers, spreaders, wetting agents, adjuvants, diluents, detergents, adhesives, anticaking agents, dyes, dispersants, emulsifying agents, defoamers, antimicrobials, antifreeze, pigments, colorants, carriers, or any embodiment of an agricultural chemical found in "Chemistry and Technology of Agrochemical Formulations," edited by D. A. Knowles, copyright 1998 and published by Kluwer Academic Publishers, hereby fully incorporated by reference, any embodiment of an agricultural chemical found in "IRAC: Mode of Action Classification and Insecticide Resistance Management", by Thomas Sparks and Ralf Nauen, Pesticide Biochemistry and Physiology, Volume 121, June 2015, Pages 122-128 hereby fully incorporated by reference, any embodiment of an agricultural chemical found in "FRAC Code List 2018: Fungicides Sorted by Mode of Action", available at http://www.frac.info/docs/default-source/publications/frac-code-list/frac_code_list_2018-final.pdf?sfvrsn=6144b9a_2 hereby fully incorporated by reference, any embodiment of an agricultural chemical found from the "Herbicide Resistance Action Committee", available at http://hracglobal.com/tools/classification-lookup hereby fully incorporated by reference, and combinations or mixtures thereof.

As used herein, a "pesticide" is any naturally occurring or synthetic chemical or biological agents (e.g., a microbe such as bacteria, fungi, yeast, virus, etc.) or any component or mixture thereof that repels, deters, injures, kills, or otherwise protects a plant, plant part, or seed from unwanted pests, such as weeds, fungi, insects, bacteria, algae, birds. "Pesticides" include, but are not limited to, acaricides, avicides, biopesticides, chemosterilants, herbicides, herbicide safeners, insecticides, molluscicides, plant activators, synergists, algicides, bactericides, fungicides, biofungicides, insect attractants, mammal repellents, nematicides, plant growth regulators, virucides, antifeedants, bird repellants, insect repellants, mating disrupters, nitrification inhibitors, rodenticides, and others, such as aluminum phosphide, calcium cyanide, dinitriphenols, magnesium phosphide, nicotine sulfate, nonanol, piperazine, polybutenes, and sodium cyanide, or any embodiment of a pesticide found in "Compendium of Pesticide Common Names: Index of Common Names," available at http://www.alanwood.net/pesticides/index_cn_frame.html, hereby incorporated by reference, and combinations or mixtures thereof. In some embodiments, biostimulants and biopesticides can include one or more microbial (e.g., bacterial) strains that exhibit plant growth and/or pesticide properties.

As used herein, a "biological agent" refers to an agent that is or is derived from an organism. For example, biological agents can include microbes (e.g., bacteria, fungi, yest, viruses, etc.). In some embodiments, biological agents can exhibit pesticidal, fungicidal, fertilizing, biostimulant, growth regulation, or other beneficial properties.

As used herein, a "fertilizer" refers to Nitrogen (N), Phosphorus (P), Potassium (K), and all derivatives, in any form (liquid, dry), of natural or synthetic origin, as well as organic and inorganic versions thereof, and any N-containing, P-containing and/or K-containing and/or N-producing, P-producing and/or K-producing compounds, and any and all combinations or mixtures thereof.

The terms "traditional fertilizing concentration," "traditional fertilizer amount" and related phrases are used herein to generally refer to amounts or concentrations of a fertilizer that are traditionally used to provide a desired average plant output or growth parameter for a particular plant in a particular set of growing conditions. In some cases, the methods and compositions provided herein can support the use of amounts of fertilizer below traditional fertilizing concentrations. The term "sub-fertilizing concentrations" refers to amounts or concentrations of fertilizer below a traditional fertilizing concentration of a particular plant in a particular set of growing conditions. For example, in some cases, a sub-fertilizing concentration can be a concentration or amount below the typical label rate for the particular plant species in the particular growing conditions.

The term "seed treatment" as used herein generally refers to a finished formulation in any form (liquid, dry, natural, synthetic, organic, inorganic), containing one or more active ingredients typically found in fertilizers and/or pesticides, that is applied to a seed (e.g., as a coating) prior to or during the time the seed is planted. Seed treatment with compositions of the present disclosure has the advantages of delivering the composition to the locus at which the seeds are planted shortly before germination of the seed and emergence of a seedling. The seed treatment can be a seed coating applied directly to an untreated and "naked" seed. However, the seed treatment can be a seed overcoat that is applied to a seed that has already been coated with "one or more previous seed coatings or seed treatments." The "one or more previous seed coatings or seed treatments" may include one or more agricultural chemicals and/or biological agents. The term "seed" as used herein, is not limited to any particular type of seed and can refer to seed from a single plant species, a mixture of seed from multiple plant species, or a seed blend from various strains within a plant species. The one or more compositions described herein can be utilized to treat gymnosperm seed, dicotyledonous angiosperm seed, and monocotyledonous angiosperm seed.

As used herein, an "effective concentration of a water-soluble oil" is intended to mean a concentration of a water-soluble oil, for example an ethoxylated macadamia oil (e.g., seed oil) having 16 ethoxylations per molecule, as disclosed herein, which is capable of inducing an increase in absorption, uptake, or efficacy of an agricultural chemical and/or biological agent using the methods and compositions disclosed herein, or capable of producing another desired effect, such as increasing, supplementing, or amplifying a population of microbes (e.g., bacteria) in a soil or growth medium. It is recognized that an effective concentration of a water-soluble oil is influenced by a number of factors including, but not limited to, the plant species or subspecies, cultivar, variety, race, or genotype thereof, temperature, light levels, day length, relative humidity, type of soil or growth medium, microbial (e.g., bacterial) strains present in or native to the soil or growth medium, isolated microbial (e.g., bacterial) strains externally added to the plant, soil, or growth medium, plant density, soil fertility level, soil pH, or the pH of the composition, as well as, the application regimen (e.g., a single dose or multiple doses at regular intervals) or other components in the composition in addition to the water-soluble oil, the type of agricultural chemical and/or biological agent, and water, such as, for example, additives and/or diluents. By following the disclosure and methods provided herein, one can determine the effective concentration of a water-soluble oil for the disclosed compositions and applications suitable for any soil, growth medium, plant, plant part, or seed.

As used herein, an "effective concentration of an agricultural chemical" or "effective concentration of a biological agent" is intended to mean a concentration of an agricultural chemical and/or biological agent, for example a microbe, a fertilizer (such as nitrogen), or a pesticide (such as a glyphosate), as disclosed herein, which is capable of, in the case of a fertilizer, providing one or more nutrients to a plant, plant part, or seed, increasing yield of a plant, stimulating growth of a plant, plant part, or seed, or improving the appearance or growth of a plant; in the case of an added isolated microbial (e.g. bacteria) strain, can increase, supplement and/or amplify the effect of such microbial strain in the soil or growth medium; and, in the case of a pesticide, provide protection to a plant, plant part, or seed from weeds, insects, fungi, bacteria, viruses, or other target pests. It is recognized that an effective concentration of an agricultural chemical and/or biological agent is influenced by a number of factors including, but not limited to, the particular agricultural chemical and/or biological agent, the plant species or subspecies, cultivar, variety, race, or genotype thereof, temperature, light levels, day length, relative humidity, type of soil or growth medium, microbial (e.g.bacterial) strains present in or native to the soil or growth medium, isolated microbial (e.g., bacterial) strains externally added to the plant, soil, or growth medium, plant density, soil fertility level, soil pH, or the pH of the composition, as well as, the application regimen (e.g., single dose or multiple doses at regular intervals) or other components in the composition in addition to the water-soluble oil, the agricultural chemical and/or biological agent, and water, such as, for example, additives and/or diluents. By following the disclosure and methods provided herein, one can determine the effective concentration of an agricultural chemical and/or biological agent for the disclosed compositions and applications suitable for any soil, growth medium, plant, plant part, or seed.

As used herein, "control," "control plant," "control plant part," or "control seed" provides a reference point for measuring changes in the subject soil, growth medium, plant, plant part, or seed (e.g., a plant treated with a composition of the present invention). Typically, the control is the same species as the subject plant, plant part, or seed and preferably, is genetically identical to the subject soil, growth medium, plant, plant part, or seed. The control is grown in the same or similar conditions as the subject soil, growth medium, plant, plant part, or seed and is treated in an identical or substantially the same manner as the subject soil, growth medium, plant, plant part, or seed but for the particular treatment applied to the subject soil, growth medium, plant, plant part, or seed. For example, a control can be exposed to a solution that is identical or essentially identical to a composition to which a subject soil, growth medium, plant, plant part, or seed is exposed except that the solution to which the control is exposed lacks the water-soluble oil that is present in the composition. As another non-limiting example, a control soil, growth medium, plant, plant part, or seed can be exposed to a solution that has a higher concentration of an agricultural chemical and/or biological agent in a composition to which a subject soil, growth medium, plant, plant part, or seed is exposed except that the solution to which the control soil, growth medium, plant, plant part, or seed is exposed lacks the water-soluble oil that is present in the composition. The control is exposed to such solutions in the same or essentially the same manner (e.g., same application, timing, duration, and/or total volume of solution applied) as a subject soil, growth medium, plant, plant part, or seed is exposed to the composition. In some embodiments, a control is contacted with composition including only water and the agricultural chemical and/or biological agent.

The term "water-soluble oil" refers to an oil or derivative of an oil that is either (i) miscible or soluble in water, in whole or in part (e.g., soluble in water at a concentration of 0.1 wt-% or more), and is derived from a plant, plant part, tree, marine, animal, or synthetic source, including but not limited to alkoxylated oils, ethoxylated oils, saponified oils, and transesterified oils. Exemplary methods of obtaining water-soluble oils include, without limitation, alkoxylation, ethoxylation, saponification, and transesterification. In some contexts herein, "water-soluble oil" and "water-miscible oil" are terms used interchangeably.

Provided herein are compositions and methods for increasing absorption, enhancing the safety profile, stability, and/or increasing the effectiveness of an agricultural active agent applied to a plant, plant part, or seed. Compositions and methods for increasing, supplementing, and/or amplifying the microbial (e.g., bacterial) population or microbial biomass of a soil or growth medium, and for supporting, supplementing, and/or amplifying growth of beneficial microbes (e.g., bacteria) in the vicinity of plants, such that in some cases nutrient uptake and/or nitrogen fixation is increased in soil and/or plants are also provided. The compositions can comprise, consist essentially of, or consist of a water-soluble oil selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry or seed oil), ethoxylated emu oil, ethoxylated mink oil, PEG Glyceryl Dimyristate, PEG Glyceryl Dioleate, PEG Glyceryl Distearate, and PEG Glyceryl Palmitate and combinations thereof; and one or more agricultural chemicals and/or biological agents selected from the group consisting of a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof. In some embodiments, the compositions can include water. In some embodiments, the compositions are oil-based.

In some cases, a water-soluble oil included in a composition provided herein can contain an average of between about 2 and about 1000 ethoxylations per molecule, between about 10 and about 1000 ethoxylations per molecule, between about 10 and about 500 ethoxylations per molecule, between about 10 and about 300 ethoxylations per molecule, between about 10 and about 100 ethoxylations per molecule, between about 10 and about 75 ethoxylations per molecule, between about 30 and about 40 ethoxylations per molecule, between about 15 and about 25 ethoxylations per molecule, or between about 10 and about 19 ethoxylations per molecule. In some embodiments, a water-soluble oil included in a composition provided herein can be selected from an ethoxylated macadamia oil (e.g., seed oil) having an average of between about 10 and about 19 ethoxylations per molecule, such as a macadamia oil (e.g., seed oil) having an average of about 16 ethoxylations per molecule. Exemplary macadamia oils (e.g., seed oils) useful in the compositions described herein include PEG-16 Macadamia Glycerides (commercial name: Florasolvs® Macadamia-16), PEG-16 Macadamia Glycerides (bio-based, 100% renewable origin, sugarcane sourced), Macadamia Seed Oil Polyglyceryl-6 Esters, and Macadamia Seed Oil Glycereth-8 Esters. In some embodiments, a water-soluble oil included in a composition provided herein can be selected from an ethoxylated olive oil having an average of about 10 ethoxylations per molecule such as PEG-10 Olive Glycerides, an ethoxylated avocado oil having an average of about 11 ethoxylations per molecule such as PEG-11 Avocado Glycerides, an ethoxylated meadowfoam oil having an average of about 75 ethoxylations per molecule such as PEG-75 Meadowfoam Oil, an ethoxylated almond oil having an average of about 20 ethoxylations per molecule such as PEG-20 Almond Glycerides, an ethoxylated corn oil having an average of about 5 ethoxylations per molecule such as PEG-5 Hydrogenated Corn Glycerides, an ethoxylated soybean oil having an average of about 35 ethoxylations per molecule such as PEG-35 Soy Glycerides, an ethoxylated jojoba oil, an ethoxylated seabuckthorn oil (e.g., fruit, berry, or seed oil), an ethoxylated emu oil, an ethoxylated mink oil having an average of about 13 ethoxylations per molecule such as PEG-13 Mink Glycerides, PEG Glyceryl Dimyristate having an average of about 12 ethoxylations per molecule such as PEG-12 Glyceryl Dimyristate, PEG Glyceryl Dioleate having an average of about 12 ethoxylations per molecule such as PEG-12 Glyceryl Dioleate, PEG Glyceryl Distearate having an average of about 12 ethoxylations per molecule such as PEG-12 Glyceryl Distearate, PEG Glyceryl Distearate having an average of about 23 ethoxylations per molecule such as PEG-23 Glyceryl Distearate, PEG Glyceryl Palmitate having an average of about 23 ethoxylations per molecule such as PEG-23 Glyceryl Palmitate, and a mixture of any two or more of the aforementioned water-soluble oils. In some embodiments of the methods and compositions provided herein, the water-soluble oil is PEG-16 Macadamia Glycerides.

A water-soluble oil can be obtained several ways including, without limitation, sourcing an existing product directly from a vendor or creating it by way of transesterification, alkoxylation, or saponification.

Depending on the intended applications of the compositions, the amount of water-soluble oil(s) suitable for the methods and compositions described herein can vary. For example, in some embodiments, the compositions described herein can comprise from about 0.01% to about 75% by weight or volume, from about 0.01% to about 60% by weight or volume, from about 0.01% to about 50% by weight or volume, from about 0.01% to about 45% by weight or volume, from about 0.01% to about 40% by weight or volume, from about 0.01% to about 35% by weight or volume, from about 0.01% to about 30% by weight or volume, from about 0.01% to about 25% by weight or volume, from about 0.01% to about 20% by weight or volume, or from about 0.01% to about 10% by weight or volume of a water-soluble oil(s), agricultural chemical(s) and/or biological agent(s), and water. That is, some embodiments of the methods described herein can comprise a composition containing less than (but not zero) or equal to 0.01%, 0.025%, 0.05%, 0.075%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.25%, 1.5%, 1.75%, 2.0%, 2.25%, 2.5%, 2.75%, 3.0%, 3.25%, 3.5%, 3.75%, 4.0%, 4.25%, 4.5%, 4.75%, 5.0%, 5.25%, 5.5%, 5.75%, 6.0%, 6.25%, 6.5%, 6.75%, 7.0%, 7.25%, 7.5%, 7.75%, 8.0% 8.25%, 8.5%, 8.75%, 9.0%, 9.25%, 9.5%, 9.75%, 10.0%, 10.25%, 10.5%, 10.75%, 11.0%, 11.25%, 11.5%, 11.75%, 12.0%, 12.25%, 12.5%, 12.75%, 13.0%, 13.25%, 13.5%, 13.75%, 14.0%, 14.25%, 14.5%, 14.75%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, 50.0%, 50.5%, 51.0%, 51.5%, 52.0%, 52.5%, 53.0%, 53.5%, 54.0%, 54.5%, 55.0%, 55.5%, 56.0%, 56.5%, 57.0%, 57.5%, 58.0%, 58.5%, 59.0%, 59.5%, 60.0%, 60.5%, 61.0%, 61.5%, 62.0%, 62.5%, 63.0%, 63.5%, 64.0%, 64.5%, 65.0%, 65.5%, 66.0%, 66.5%, 67.0%, 67.5%, 68.0%, 68.5%, 69.0%, 69.5%, 70.0%, 70.5%, 71.0%, 71.5%, 72.0%, 72.5%, 73.0%, 73.5%, 74.0%, 74.5%, or 75.0% water-soluble oil(s) by weight or volume or an amount that is within a range defined by any two of the aforementioned amounts. For example, the amount of water-soluble oil(s) in the composition can be from about 0.01% to about 75% by weight or volume (e.g., from about 0.01% to about 1%, or from about 0.01% to about 2%, from about 0.01% to about 4%, from about 0.01% to about 5%, from about 0.01% to about 7%, from about 0.01% to about 10%, from about 0.1% to about 5%, from about 0.1% to about 10%, from about 0.01% to about 25%, from about 0.01% to about 50%, from about 1% to about 10%, from about 1% to about 25%, from about 1% to about 50%, from about 0.01% to about 75%, or from about 25% to about 75%). In some embodiments, the amount of water-soluble oil in the composition can be 0.01%, 0.025%, 0.05%, 0.075, 0.1%, 0.25%, 0.5%, 0.6%, 0.75%, 1%, 1.5%, 2%, 2.5%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% by weight or volume or a percentage that is within a range defined by any two of the aforementioned percentages. For example, the amount of water-soluble oil in a composition provided herein can be from about 0.01% to about 25% by weight or volume (e.g., from about 0.01% to about 1%, or from about 0.01% to about 2%, from about 0.01% to about 4%, from about 0.01% to about 5%, from about 0.01% to about 7%, from about 0.01% to about 10%, from about 0.01% to about 15%, or from about 0.01% to about 25%). In some cases, the amount of water-soluble oil in the composition is about 0.5%, the amount of water-soluble oil in the composition is about 0.6%, the amount of water-soluble oil in the composition is about 1%, the amount of ethoxylated oil in the composition is about 2%, or the amount of ethoxylated oil in the composition is about 5%.

In some embodiments, the compositions can comprise agricultural chemical(s) and/or biological agent(s) or any component thereof that are described herein. Such agricultural chemical(s) and/or biological agents can act to modify plant growth and/or protect the plant when applied to plants, plant parts, or seeds or in the vicinity of plants, plant parts, or seeds, particularly in conjunction with the water-soluble oil(s) or compositions described herein. In some embodiments, an agricultural chemical and/or biological agent includes any naturally occurring or synthetic chemical or any component thereof that is used in a chemical composition including, but not limited to, fertilizers, pesticides, microbes (e.g., bacteria, fungi, yeast, etc.), insecticides, acaricides, nematicides, fungicides, bactericides, herbicides, plant growth regulators, biostimulants, biopesticides, nutrients, drift reduction agents, utility adjuvants, water conditioners, penetrants, pH buffers, activators, surfactants, stabilizers, preservatives, stickers, spreaders, wetting agents, adjuvants, diluents, detergents, adhesives, anticaking agents, dyes, dispersants, emulsifying agents, defoamers, antimicrobials, antifreeze, pigments, colorants, carriers, or any embodiment of an agricultural chemical or biological agent found in "Chemistry and Technology of Agrochemical Formulations," edited by D. A. Knowles, copyright 1998 and published by Kluwer Academic Publishers, hereby fully incorporated by reference.

Depending on the intended applications of the compositions described herein, the amount of agricultural chemicals(s) and/or biological agent(s) suitable for the methods and compositions described herein can vary. For example, in some embodiments, the compositions described herein can comprise from about 0.001% to about 50% by weight or volume, from about 0.001% to about 40% by weight or volume, from about 0.001% to about 30% by weight or volume, from about 0.001% to about 25% by weight or volume, from about 0.001% to about 20% by weight or volume, from about 0.001% to about 15% by weight or volume, from about 0.001% to about 10% by weight or volume, from about 0.01% to about 10% by weight or volume, from about 0.1% to about 10% by weight or volume, from about 0.1% to about 5% by weight or volume, or from about 1% to about 10% by weight or volume of agricultural chemical(s) and/or biological agent(s), water-soluble oil(s), and water, with or without additional additives, inerts, and/or diluents. That is, some embodiments of the methods described herein can comprise a composition containing less than (but not zero) or equal to 0.001%, 0.0025%, 0.005%, 0.0075%, 0.01%, 0.025%, 0.05%, 0.075%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.25%, 1.5%, 1.75%, 2.0%, 2.25%, 2.5%, 2.75%, 3.0%, 3.25%, 3.5%, 3.75%, 4.0%, 4.25%, 4.5%, 4.75%, 5.0%, 5.25%, 5.5%, 5.75%, 6.0%, 6.25%, 6.5%, 6.75%, 7.0%, 7.25%, 7.5%, 7.75%, 8.0% 8.25%, 8.5%, 8.75%, 9.0%, 9.25%, 9.5%, 9.75%, 10.0%, 10.25%, 10.5%, 10.75%, 11.0%, 11.25%, 11.5%, 11.75%, 12.0%, 12.25%, 12.5%, 12.75%, 13.0%, 13.25%, 13.5%, 13.75%, 14.0%, 14.25%, 14.5%, 14.75%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, or 50.0% agricultural chemical(s) and/or biological agent(s) by weight or volume or an amount that is within a range defined by any two of the aforementioned amounts. For example, the amount of agricultural chemical(s) and/or biological agent(s) in the composition can be from about 0.001% to about 50% by weight or volume (e.g., from about 0.001% to about 0.01%, from about 0.001% to about 0.1%, from about 0.001% to about 0.25%, from about 0.001% to about 0.5%, from about 0.01% to about 1%, from about 0.01% to about 2%, or from about 0.01% to about 4%). In some embodiments, the amount of agricultural chemical(s) and/or biological agent(s) in the composition can be 0.001%, 0.0025%, 0.005%, 0.0075%, 0.01%, 0.025%, 0.05%, 0.075%, 0.1%, 0.25%, 0.5%, 0.6%, 0.75%, 1%, 1.5%, 2%, 2.5%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% by weight or volume or a percentage that is within a range defined by any two of the aforementioned percentages. For example, the amount of agricultural chemical(s) and/or biological agent(s) in a composition provided herein can be from about 0.001% to about 25% by weight or volume (e.g., from about 0.001% to about 1%, from about 0.01% to about 1%, from about 0.001% to about 0.25%, from about 0.001% to about 0.5%, from about 0.1% to about 1%, from about 1% to about 10%, from about 5% to about 25%, from about 0.001% to about 0.25%, from about 1% to about 20%, from about 1% to about 15%, or from about 10% to about 15%).

In some cases, the amount of agricultural chemical(s) and/or biological agent(s) in the composition is about 0.5%, the amount of agricultural chemical(s) and/or biological agent(s) in the composition is about 1%, the amount of agricultural chemical(s) and/or biological agent(s) in the composition is about 5%, the amount of agricultural chemical(s) and/or biological agent(s) in the composition is about 10%, the amount of agricultural chemical(s) and/or biological agent(s) in the composition is about 12%, or the amount of agricultural chemical(s) and/or biological agent(s) in the composition is about 15%.

In some embodiments, an agricultural active agent can include one or more strains of microbes (e.g., bacteria). It has been surprisingly discovered that application of certain water-soluble or water-miscible oils, particularly those high in palmitoleic acid and/or oleic acid, to plants, plant parts, seeds, soil, or other growth medium can promote, supplement and/or support growth, stability, and/or multiplication of beneficial microbes (e.g., bacteria) and/or an increase in microbial biomass in a soil or growth medium. Without wishing to be bound by theory, it is believed that certain water-soluble or water-miscible oils, particularly those comprising palmitoleic acid in an amount of greater than 10% of the fatty acid content of the oil, can promote, supplement and/or support growth, stability, and/or multiplication or beneficial microbes (e.g., bacteria) and/or an increase in microbial biomass in a soil or growth medium. Without wishing to be bound by theory, it is further believed that certain water-soluble or water-miscible oils comprising oleic acid in an amount of greater than 40% of the fatty acid content of the oil can itself also promote, supplement and/or support growth, stability, and/or multiplication of beneficial microbes (e.g., bacteria) and/or an increase in microbial biomass in a soil or growth medium. Without wishing to be bound by theory, it is believed that such oils (or ethoxylated oils) can provide favorable conditions, including a carbon source for microbes (e.g., bacteria) to decompose, and/or building blocks of microbial (e.g., bacterial) membranes, for beneficial microbes (e.g., bacteria) , including microbes (e.g., bacteria) that are native or non-native to the soil or growth medium in the vicinity of a plant. The promotion, supplementation, and/or support of microbial (e.g., bacterial) growth and/or biomass is believed to provide beneficial growth conditions for plants. In some embodiments, the combination of application of a water soluble macadamia oil and one or more microbial strains (e.g., bacterial strain) can increase plant yield or modify the growth of a plant such that at least one desirable growth parameter or characteristic as described herein is modified when compared to a control plant or soil that has not been contacted with the water-soluble macadamia oil and a bacteria strain(s) combination. In some embodiments water-soluble sea buckthorn oil, water-soluble avocado oil, and water-soluble olive oil can also provide beneficial growth conditions for certain soil microbes (e.g., bacteria), such as gram negative bacteria.

Microbes (e.g., bacteria) whether found in native soil or other amendments or externally added to soil or other amendments as isolated microbials, useful in the methods and compositions described herein can include gram-negative bacteria, grampositive bacteria, and combinations thereof Without wishing to be bound by theory it is believed gram negative and gram positive bacteria exhibit different benefits. In some embodiments, growth of gram negative bacteria can be supported or enhanced by compositions and methods using oils (e.g., ethoxylated oils) having high (e.g., equal to or greater than 10% of the total fatty acid content) palmitoleic acid content. In some embodiments, growth of gram positive bacteria can be supported or enhanced by compositions and methods using oils (e.g., ethoxylated oils) having high (e.g., equal to or greater than 40% of the total fatty acid content) oleic acid content.

Microbials useful in the methods and compositions described herein can include any beneficial soil or growth medium microbial (e.g., bacteria, fungi, yeast, etc.). Exemplary non-limiting mirobials useful in some embodiments of the compositions and methods described herein include *Bacillus Thuringiensis, Rhizobium, Bradyyrhizobium, Ensifer/Sinorhizobium, Arbuscular Mycorrhizal Fungi, Piriformosa Indica, Bacillus, Burkolderia, Erwinia, Pseudomonas, Azospirillum, Burkolderia,* and *Agrobacterium*, and combinations thereof. In some embodiments, microbials useful herein can include Proteobacteria, firmicutes, and actinobacteria. In some embodiments, bacteria useful herein can include diazotrophic bacteria. Exemplary non-limiting species or genuses can include *Enterobacter, Rhanella, Klebsiella, Sinorhizobium, Stenotrophomonas, Pantoea, Rhizobium, Herbaspirillum, Pantoea, Serratia, Rahnella, Rhizobia, Azospirillum, Azorhizobium, Azotobacter, Duganella, Delftia, Bradyrhizobiun, Sinorhizobium, Halomonas, Paenibacillus, Lactobacillus, Lysobacter, Mycoplasma, Acetabacterium, Streptomyces, Trichoderma, Rhodacoccus, Microbacterium, Chromobacterium, Curtobacterium, Variovorax, Pasteuria, Paenibacillus, Xanthomonas*, and combinations thereof.

In some embodiments, the microbial (e.g., bacteria) is selected from *Azotobacter vinelandii, Bradyrhizobium japonicum, Klebsiella pneumoniae, Sinorhizobium meliloti, Enterobacter cloacae, Citrobacter freundii, Comamonas testosterone, Pseudomonas putida*, and combinations thereof.

In some embodiments, other beneficial microbes can be used or targeted, such as yeast and fungi species (e.g., *Paecilomyces, Trichoderma, Ampelomyces, Gliocladium, Metschnikowia*), and oomycote species (e.g., *Pythium*).

In some embodiments, microbials (e.g., bacteria) used in the compositions and methods herein can be used in wild type or genetically modified forms. In some embodiments, the microbials (e.g., bacteria) can be present as pure or enriched cultures of the bacteria. In some embodiments, the microbials (e.g., bacteria) can be added to compositions described herein, used in methods described herein, and/or applied directly to soil or growth medium as described herein at a concentration of from about $10^1$ to about $10^{15}$ CFU/ml. In some embodiments, the microbials (e.g., bacteria) can be added to compositions described herein, used in methods described herein, and/or applied directly to soil or growth medium as described herein at a concentration of from about $10^5$ to about $10^{10}$ CFU/ml.

In some embodiments, microbials (e.g., bacteria) can be applied to a plant, plant part, seed, soil, or growth medium, in combination with certain oils (or ethoxylated oils) as described herein.

In some embodiments, the addition of isolated, externally added microbials (e.g., bacteria) is not necessary. Rather, application of one or more oils or ethoxylated oils as described herein can be used in combination with the naturally occurring microbes (e.g., bacteria, fungi, yeast, etc.) already present in the soil or growth medium. Without wishing to be bound by theory, application of one or more oils or ethoxylated oils as described herein can support, supplement, stabilize, and/or amplify the growth and beneficial properties of naturally occurring soil or growth medium microbials, which in turn can provide fertilizing and beneficial effects toplants. In some embodiments, the naturally occurring soil or growth medium microbials (e.g., bacteria) can provide for decreased fertilizer requirements for the plants.

In some embodiments, an agricultural chemical useful in the compositions and methods described herein can include one or more fertilizers, such as Nitrogen (N), Phosphorus (P), Potassium (K), and all derivatives, in any form (liquid, dry), of natural or synthetic origin, as well as organic and inorganic versions thereof, and any N-containing, P-containing and/or K-containing and/or N-producing, P-producing and/or K-producing compounds, and any and all combinations or mixtures thereof.

In some embodiments, the application of one or more oils or ethoxylated oils described herein can reduce the amount of fertilizer application necessary. For example, traditional fertilizer amounts for each plant type can be reduced by about 10% to about 80%, for example, fertilizer amounts can be reduced by 10%, 15%, 20%, 25%, 30%, 40%, 50%, 60%, 70%, and 80%.

In some embodiments, a fertilizer can added as a biostimulant or biofertilizer at sub-fertilizing concentrations. For example, nitrogen can be added at concentrations below traditional fertilizing concentrations for the particular plant species, type, use, and/or growing conditions. In some embodiments, the plants can be grown without the use of nitrogen at traditional fertilizing concentrations. In some embodiments, nitrogen can be used in amounts lower than traditional fertilizing concentrations. For example, nitrogen may be used in amounts that are 90% of traditional fertilizing concentrations or lower. For example, nitrogen can be provided at a traditional fertilizing concentration for the particular plant species, type, and/or growing conditions, at 90% of a traditional fertilizing concentration, at 80% of a traditional fertilizing concentration, at 70% of a traditional fertilizing concentration, at 60% of a traditional fertilizing concentration, at 50% of a traditional fertilizing concentration, at 40% of a traditional fertilizing concentration, at 30% of a traditional fertilizing concentration, at 20% of a traditional fertilizing concentration, at 10% of a traditional fertilizing concentration, at 5% of a traditional fertilizing concentration, and from about 5% to about 95% of a traditional fertilizing concentration.

In some embodiments, an agricultural chemical and/or biological agent useful in the compositions and methods described herein can include one or more pesticides, such as any naturally occurring or synthetic chemical or biological agent (e.g., a virus, bacteria, fungi, yeast, etc.) or any component thereof that repels, deters, injures, kills, or otherwise protects a plant, plant part, or seed from unwanted pests, such as weeds, fungi, insects, bacteria, algae, or birds. Exemplary pesticides for use in the compositions and methods herein include, but are not limited to, acaricides, avicides, chemosterilants, herbicides, herbicide safeners, insecticides, molluscicides, plant activators, synergists, algicides, bactericides, fungicides, insect attractants, mammal repellents, nematicides, plant growth regulators, virucides, antifeedants, bird repellants, insect repellants, mating disrupters, nitrification inhibitors, rodenticides, and others, such as aluminum phosphide, calcium cyanide, dinitriphenols, magnesium phosphide, nicotine sulfate, nonanol, piperazine, polybutenes, and sodium cyanide, or any embodiment of a pesticide found in "Compendium of Pesticide Common Names: Index of Common Names," available at http://www.alanwood.net/pesticides/index_cn_frame.html, herein fully incorporated by reference, and any combinations or mixtures thereof.

In some embodiments, the agricultural chemical can include glyphosate (N-phosphonomethylglycine) or a salt thereof, including water-soluble glyphosate salts such as trimethylsulphonium, isopropylamine, sodium, potassium, or ammonium salts, or glyphosate acid. In some embodiments, the glyphosate is applied at a typical label rate (e.g., 5 to 35 fluid ounces per acre) for the particular species and/or application. In some embodiments, the glyphosate can be applied at less than the typical label rate for the particular species and/or application (e.g., where the typical label rate is 5 to 35 fluid ounces per acre, the glyphosate can be applied at a rate of 4 to 28 fluid ounces, 3 to 21 fluid ounces, 2 to 14 fluid ounces, or 2.5 to 17.5 fluid ounces per acre). Without wishing to be bound by theory, it is believed that the inclusion of the water-soluble oil in the composition described herein when combined with the agricultural chemical (e.g., glyphosate) can enhance the effectiveness of the glyphosate such that a lesser or equal concentration, a reduction in the application rate, and/or a reduction in the frequency of application of the glyphosate can be achieved when compared to a composition combined with the same agricultural chemical agent (e.g., glyphosate) that does not contain any of the water-soluble oils described herein.

In some embodiments, the agricultural chemical and/or biological agent can include nitrogen, a nitrogen derivative, a nitrogen-containing or nitrogen-generating compound, urea, a urea derivative, or a urea-containing compound, including, without limitation, anhydrous ammonia, urea-ammonium nitrate (UAN) solutions, and granular urea. In some embodiments, nitrogen, a nitrogen derivative, a nitrogen-containing or nitrogen-generating compound, urea, a urea derivative, or a urea-containing compound is applied at a typical label rate (e.g., 143 pounds of nitrogen per acre per year for corn) for the particular species and/or application. In some embodiments, nitrogen, a nitrogen derivative, a nitrogen-containing or nitrogen-generating compound, urea, a urea derivative, or a urea-containing compound can be applied at less than the typical label rate for the particular species and/or application (e.g., where the typical label rate is 143 pounds of nitrogen per acre per year for corn, the nitrogen, a nitrogen derivative, a nitrogen-containing or nitrogen-generating compound, urea, a urea derivative, or a urea-containing compound can be applied at a rate of from about 70 pounds to about 135 pounds per acre per year, from about 100 pounds to about 135 pounds per acre per year, from about 70 pounds to about 80 pounds per acre per year, from about 80 pounds to about 90 pounds per acre per year, or at about 72, 80, 85, 90, 100, 110, 115, 120, 130, or 135 pounds per acre per year). Without wishing to be bound by theory, it is believed that the inclusion of the water-soluble oil in the composition described herein when combined with the agricultural chemical and/or biological agent (e.g., nitrogen, a nitrogen derivative, a nitrogen-containing or nitrogen-generating compound, urea, a urea derivative, or a urea-containing compound) can enhance the effectiveness of the nitrogen, a nitrogen derivative, a nitrogen-containing or nitrogen-generating compound, urea, a urea derivative, or a urea-containing compound such that a lesser or equal concentration, a reduction in the application rate, and/or a reduction in the frequency of application of the nitrogen, a nitrogen derivative, a nitrogen-containing or nitrogen-generating compound, urea, a urea derivative, or a urea-containing compound can be achieved when compared to a composition combined with the same agricultural chemical and/or biological agent (e.g., nitrogen, a nitrogen derivative, a nitrogen-containing or nitrogen-generating compound, urea, a urea derivative, or a urea-containing compound) that does not contain any of the water-soluble oils described herein. Without wishing to be bound by theory, it is believed that the use of the water-soluble or water-miscible oils described herein can promote, stabilize, or support the growth of beneficial microbes (e.g., bacteria) present in or externally added to the soil or growth medium. Microbes (e.g., bacteria) can provide nitrogen fixation and can convert organically bound nitrogen in the soil or growth medium into plant-usable or plant-available nitrogen (a process sometimes called mineralization), thus reducing and/or eliminating the need for nitrogen fertilization or the plant or plants.

In some embodiments, the agricultural chemical and/or biological agent can include the plant growth regulator (or PGR) Trinexapac-ethyl (commercial name: Primo MAXX®) or any Trinexapac-ethyl derivative or Trinexapac-ethyl-containing compound thereof, where the agricultural chemical and/or biological agent contains Trinexapac-ethyl (for example, Primo MARX®). In some embodiments, the plant growth regulator is applied at a typical label rate (e.g., 3 to 88 fluid ounces per acre) for the particular species and/or application. In some embodiments, the plant growth regulator can be applied at less than the typical label rate for the particular species and/or application (e.g., where the typical label rate is 3 to 88 fluid ounces per acre, the PGR can be applied at a rate of, for example, from about 1.5 to about 80 fluid ounces per acre, from about 1.5 to about 44 fluid ounces per acre, or from about 2 to about 80 fluid ounces per acre, or from about 4 to about 87 fluid ounces per acre).

It should be noted that the above combinations are examples only, and that the agricultural chemical and/or biological agents can include other fertilizers and pesticides, and such agricultural chemical and/or biological agents can be applied at various label rates (e.g., lower than or equal to the label rates of control agricultural chemical and/or biological agents, which means agricultural chemical and/or biological agents that do not contain or are not combined with any of the water-soluble oils described herein) depending on the plant, soil, growth medium or seed to be treated, the time of year, the season, the organism to be targeted, and/or the desired outcome to be achieved. Exemplary desired outcomes can include, without limitation, increased pest control, improved plant yield, improved plant health, improved plant growth, an improved safety profile for the selected agricultural chemical and/or biological agent, a reduction in chemical load of the agricultural chemical and/or biological agent, an increase in stability of the agricultural active agent, or an increase in effectiveness or performance of the agricultural chemical and/or biological agent.

In some cases, additional agents can be added to the compositions described herein. For example, agents that can be added include, but are not limited to, surfactants; humectants such as glycerin, glycols, or sorbitol; water soluble agrochemical oils; synthetic oils such as mineral oil or petrolatum; natural oils such as sunflower oil or safflower oil; silicones such as dimethicone or cyclomethicone; esters such as isopropyl palmitate or caprylic or capric triglyceride; butters such as coffee butter, cocoa butter, or shea butter; skin barrier ingredients such as ceramides or fatty acids including unsaturated fatty acids, fatty alcohols, or waxes. In some cases, dextrans, cyclodextrins, hyaluronic acid, and/or urea can be added to a composition provided herein.

In some cases, a composition provided herein can be further formulated into dissolvable wet or dry beads with different dissolution rates to provide for longer term delivery, stability, and/or reduction of oxidation of the oil used in a composition. Such beads can be applied to a reservoir of water that is used in preparation for application to plants, plant parts, or seeds, or mixed directly into the soil or growth medium as a soil or growth medium amendment in order to modify or otherwise affect the growth of plants, plant parts, or seeds, or protect plants, plant parts or seeds from pests. Such beads can be encapsulating beads such that the water-soluble oil and agricultural chemical and/or biological agent composition is encapsulated within a shell of the bead, wherein said shell is comprised, for example, of a sugar, dextran, cyclodextrin, or wax.

In some embodiments, this document provides methods for making a composition described herein. In some cases, water-based compositions can be made by mixing the agricultural chemical and/or biological agent with the water-soluble oil and water. In some embodiments, one or more additional agrochemical ingredients, surfactants, or other additives can be included. The water-based compositions can subsequently be applied directly to a plant, plant part, seed, growth medium, or soil or diluted prior to use. Such compositions can also be formulated into a dissolvable wet or dry bead prior to being applied directly to a plant, plant part, seed, growth medium, or soil, or diluted prior to use.

In some embodiments, a composition described herein can be an aqueous composition made by adding one or more water-soluble oils and one or more agricultural chemical and/or biological agents to water; and mixing the composition to form a homogenous solution. The water-soluble oil(s) and agricultural chemical and/or biological agent(s) can be added in such an amount as to achieve the desired final concentration of the composition. In some cases, a concentrated solution of a composition is made by dissolving a maximum soluble amount of water-soluble oil(s) and agricultural chemical and/or biological agent(s) in water. The concentrated solution can later be diluted to the desired concentration for use in the methods described herein. In some embodiments, a composition can exhibit complete solubility and pourability in the temperature range of from about −10° C. to about 50° C. In some embodiments, the components of a composition provided herein can be combined via seeding at low temperature. In some embodiments, the ratio of water-soluble oil to agricultural chemical and/or biological agent or the ratio of agricultural chemical and/or biological agent to water-soluble oil can range from about 1:10, respectively, to about 2:1, respectively.

In some embodiments, oil-based compositions can be made by mixing the agricultural chemical and/or biological agent with the water-soluble oil and no water. In some embodiments, one or more additional agrochemical ingredients, surfactants, or other additives can be included. The oil-based compositions can subsequently be applied directly to a plant, plant part, seed, growth medium, or soil, or diluted prior to use. Such compositions can also be formulated into a dissolvable wet or dry bead prior to being applied directly to a plant, plant part, seed, growth medium, or soil, or diluted prior to use.

This document also provides methods for treating a plant, plant part, soil, growth medium, or seed with a composition described herein. In some cases, such methods can include contacting a plant, plant part, soil, growth medium, or seed with a composition comprising one or more water-soluble oils selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and one or more agricultural chemical and/or biological agents selected from a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof; and, optionally comprising water, a surfactant, an agrochemical ingredient (e.g., adjuvant or inert), an additive, a diluent, or a combination or mixture thereof.

In some embodiments, a method of increasing the effectiveness of an agricultural chemical and/or biological agent on a plant, plant part, soil, growth medium, or seed is provided, comprising contacting the plant, plant part, soil, growth medium, or seed, with one or more water-soluble oils selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and one or more agricultural chemical and/or biological agents selected from a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof, wherein the plant, plant part, soil, growth medium, or seed displays increased effectiveness of the agricultural chemical and/or biological agent as compared to a plant, plant part, soil, growth medium, or seed that was contacted with the same agricultural chemical and/or biological agent and was not contacted with the water-soluble oil. For example, in some embodiments, fertilizers such as nitrogen can be applied to the plants (e.g., as an agricultural active agent in combination with one or more water-soluble oils, particularly those high in palmitoleic acid and/or oleic acid) at sub-fertilizer concentrations, but the plants can still achieve a yield threshold, growth and/or an average growth parameter that is the same as or better than an average yield threshold or growth parameter of a control plant.

In some embodiments, a method of increasing the absorption of an agricultural chemical and/or biological agent into a plant, plant part, soil, growth medium, or seed is provided, comprising contacting the plant, plant part, soil, growth medium, or seed with one or more water-soluble oils selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry, or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and one or more agricultural chemical and/or biological agents selected from a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof, wherein the plant, plant part, soil, growth medium, or seed displays increased absorption of the agricultural chemical and/or biological agent as compared to a plant, plant part, soil, growth medium, or seed that was contacted with the agricultural chemical and/or biological agent and was not contacted with the water-soluble oil.

In some embodiments, a method of reducing the application concentration, application rate, and/or application frequency of an agricultural chemical and/or biological agent to a plant, plant part, soil, growth medium, or seed is provided, comprising contacting the plant, plant part, soil, growth medium, or seed with a water-soluble oil selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry or seed oil), ethoxylated emu oil, ethoxylated mink oil, PEG Glyceryl Dimyristate, PEG Glyceryl Dioleate, PEG Glyceryl Distearate, and PEG Glyceryl Palmitate; and an agricultural chemical and/or biological agent selected from a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof, wherein the plant, plant part, soil, growth medium, or seed displays an equivalent or enhanced beneficial response to the agricultural chemical and/or biological agent as compared to a plant, plant part, soil, growth medium, or seed that was contacted with the same or higher concentration, application rate, and/or application frequency of the same agricultural chemical and/or biological agent and not contacted with the one or more water-soluble oils. In some cases, the agricultural chemical and/or biological agent is applied at a typical label rate for the particular species and/or application. In some cases, the agricultural chemical and/or biological agent can be applied at less than the typical label rate, such as a non-limiting example at sub-fertilizer amounts, for the particular species and/or application while maintaining the same or showing enhanced effectiveness and/or absorption or uptake of the agricultural chemical and/or biological agent comprising a water-soluble oil as described herein when compared to a composition comprising the same agricultural chemical and/or biological agent without any such water-soluble oil. In some cases, the agricultural chemical and/or biological agent can be applied at less than the typical label rate for the particular species and/or application while providing an enhanced safety profile of the agricultural chemical and/or biological agent comprising a water-soluble oil as described herein when compared to a composition comprising the same agricultural chemical and/ or biological agent without any such water-soluble oil. In some cases, the agricultural chemical and/or biological agent can be applied at less than the typical label rate for the particular species and/or application while maintaining an improved effectiveness, safety profile, stability, uptake, and/or absorption of the agricultural chemical and/or biological agent comprising a water-soluble oil as described herein when compared to a composition comprising the same agricultural chemical and/or biological agent without any such water-soluble oil. Without wishing to be bound by theory, it is believed that the inclusion of the water-soluble oil in the composition with the agricultural chemical and/or biological agent can enhance the effectiveness of the agricultural chemical and/or biological agent such that a lesser or equal concentration, a reduction in the application rate, and/or a reduction in the frequency of application of the agricultural chemical and/or biological agent can be achieved when compared to a composition combined with the same agricultural chemical and/or biological agent that does not contain such water-soluble oil.

In some embodiments, a method of treating a soil or growth medium is provided, comprising contacting the soil or growth medium with an effective amount of a water-soluble oil selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry, or seed oil), ethoxylated emu oil, ethoxylated mink oil, PEG Glyceryl Dimyristate, PEG Glyceryl Dioleate, PEG Glyceryl Distearate, and PEG Glyceryl Palmitate and combinations thereof; and an agricultural chemical and/or biological agent selected from a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, colorant, and combinations thereof In some embodiments, contacting the plant, plant part, or seed can comprise separately contacting the plant, plant part, or seed with one or more water-soluble oils and with one or more agricultural chemical and/or biological agents. For example, in some embodiments, a water-soluble oil and an agricultural chemical and/or biological agent can be applied to the plant, plant part, or seed sequentially.

In some embodiments, contacting the plant, plant part, or seed can comprise simultaneously contacting the plant, plant part, or seed with one or more water-soluble oils and with one or more agricultural chemical and/or biological agents. For example, in some embodiments, contacting the plant, plant part, or seed can include contacting the plant, plant part, or seed with a composition (e.g., a single composition) comprising a water-soluble oil(s) and an agricultural chemical and/or biological agent(s).

The plants, plant parts, or seeds can be contacted with the composition using any appropriate method for applying irrigation water and/or agricultural chemical and/or biological agents to plants, plant parts, seeds, or to the vicinity surrounding the plants, plant parts or seed treatments. In some embodiments, contacting the plant, plant part, or seed can comprise applying one or more water-soluble oils and one or more agricultural chemical and/or biological agents to the soil or growth medium in the vicinity of the plant, plant part, or seed. In some embodiments, contacting the plant, plant part, or seed can comprise applying a composition to the soil or growth medium in the vicinity of the plant, plant part, or seed. In some embodiments, a composition provided herein is applied to the soil in the vicinity of a plant, plant part, or seed growing outdoors in a field, whereby the plant's roots are contacted with the composition as it enters and migrates through soil and/or growth medium. In such embodiments, the composition can be applied to the soil surface or injected into the soil at a depth where the plant's roots are expected to be. In some embodiments, contacting the plant or plant part can comprise applying one or more water-soluble oils and one or more agricultural chemical and/or biological agents to the plant, or plant part by foliar application. In some embodiments, contacting the plant or plant part can comprise applying a composition provided herein by in-furrow application. In some embodiments, contacting the plant or plant part can comprise applying a composition provided herein to the plant or plant part by drench application. In some embodiments, a composition provided herein is applied to either the soil or other growth medium in the vicinity of the plant, plant part, or seed and also to above-ground portions of plants, plant parts, or seeds. In some embodiments, contacting the soil or growth medium with a composition described herein can secondarily benefit the plant by promoting, stabilizing, amplifying, supplementing, or supporting growth of beneficial microbials. In other embodiments, a composition provided herein is sprayed on the above-ground portions of the plant using hand-held sprayers, backpack sprayers, sprayers pulled behind tractors, self-propelled sprayers, crop-dusting aircraft or the irrigation system itself (e.g, spray irrigation, drench irrigation, drip irrigation, or flood irrigation). It is recognized that when a composition provided herein is applied by any of such application methods, a portion of the composition will typically be applied to the surface of the soil or growth medium in the vicinity of the plant, plant part, or seed.

In some embodiments of the methods provided herein, contacting the plants, plant parts, or seeds with a composition described herein can lead to healthier, more productive plants having, e.g., increased biomass or yield. The plant characteristics, including the health, appearance, and biomass or yield of the plants can be determined by methods disclosed herein or otherwise known in the art. In some embodiments, the methods described herein can result in an increased microbial biomass or microbial colonization in the soil or growth medium in the vicinity of a plant, plant part, or seed. For example, in some embodiments, an increase in microbial biomass or microbial colonization of greater than 1% can occur in a soil or growth medium treated with, or in the vicinity of a plant, plant part, or seed treated with, one or more compositions described herein. In some embodiments, an increase in microbial biomass or microbial colonization of greater than 2%, greater than 5%, greater than 10%, greater than 20%, greater than 30%, greater than 40%, greater than 50%, or greater than 100%, or more, can occur.

In some embodiments, the methods provided herein can comprise applying a composition described herein to a plant, plant part, soil, growth medium, or seed to enhance, promote, or maintain a desired level or an amount of at least one growth parameter or characteristic relative to the control composition applied to the control plant, control plant part, control soil, control growth medium, or control seed that is required to maintain the desired level or amount of the at least one growth parameter or characteristic. Such growth parameters or characteristics include, without limitation, turgidity, plant color, leaf color, biomass, agronomic yield, photosynthesis, growth rate, root weight, root length, shoot weight, shoot length, leaf weight, leaf length, flower production, seed production, bulb production, fruit production, vegetable production, soil surface coverage, microbial biomass, microbial colonization, visual quality, volumetric water content, and dark green color index. Additional growth parameters or characteristics are described herein.

In some embodiments, a method for modifying or otherwise affecting the growth of a plant in a desired way can include determining or measuring in a plant, plant part, soil, growth medium, or seed contacted with a composition described herein one or more growth parameters or characteristics of interest and optionally determining or measuring the same one or more growth parameters or characteristics in a control plant, control plant part, control soil, control growth medium, or control seed. Determining or measuring the one or more growth parameters or characteristics of interest in a plant, plant part, soil, growth medium, or seed treatment can include, for example, determining fresh weights and/or dry weights of the plant, plant part or seed treatment, determining the water content of the plant, plant part or seed treatment, measuring plant height, determining agronomic yield, determining biomass, determining root length, determining root fresh weight, determining root dry weight, determining microbial biomass, determining microbial colonization, and measuring photosynthesis.

Methods for determining or measuring such plant, plant part, soil, growth medium, or seed growth parameters or characteristics are disclosed herein or otherwise known in the art.

In some embodiments, the methods provided herein can comprise applying a reduced agricultural chemical and/or biological agent concentration composition described herein to a plant, plant part, soil, growth medium, or seed treatment to promote or maintain a desired level or an amount of at least one growth parameter or characteristic relative to a control composition that comprises a higher agricultural chemical and/or biological agent concentration composition applied to the control plant, control plant part, control soil, control growth medium, or control seed that is required to maintain the desired level or amount of at least one growth parameter or characteristic. Such growth parameters or characteristics include, without limitation, turgidity, plant color, leaf color, biomass, agronomic yield, photosynthesis, growth rate, root weight, root length, shoot weight, shoot length, leaf weight, leaf length, flower production, seed production, bulb production, fruit production, vegetable production, soil surface coverage, microbial biomass, microbial colonization, visual quality, volumetric water content, and dark green color index. Additional growth parameters or characteristics are described herein. For example, in some embodiments, a fertilizer such as nitrogen can be applied at sub-fertilizer concentrations or concentrations less than traditional or label rate fertilizer concentrations offered commercially, but the plant can exhibit growth parameters the same or better than a control plant receiving traditional amounts of or label rate fertilizer offered commercially.

In some embodiments, a method for reducing the agricultural chemical and/or biological agent concentration when applied to a plant in a desired way can include determining or measuring in a plant, plant part, soil, growth medium, or seed contacted with a reduced agricultural chemical and/or biological agent concentration composition described herein one or more growth parameters or characteristics of interest and optionally determining or measuring the same one or more growth parameters or characteristics in a control plant, control plant part, control soil, control growth medium, or control seed that are contacted with a composition having a higher agricultural chemical and/or biological agent concentration comprising no water-soluble oil vs. the reduced agricultural chemical and/or biological agent concentration composition comprising an water-soluble oil. Determining or measuring the one or more growth parameters or characteristics of interest in a plant, plant part, soil, growth medium, or seed treatment can include, for example, determining fresh weights and/or dry weights of the plant, plant part or seed treatment, determining the water content of the plant, plant part or seed treatment, measuring plant height, determining agronomic yield, determining biomass, determining root length, determining root fresh weight, determining root dry weight, determining microbial biomass, determining microbial colonization, and measuring photosynthesis.

Methods for determining or measuring reduced and higher agricultural chemical and/or biological agent concentrations and the impact such concentrations have on such plant growth parameters or characteristics are disclosed herein or otherwise known in the art.

In some embodiments, methods are provided for increasing microbial biomass or microbial (e.g., bacterial) colonization in a soil or plant growth medium. In some embodiments, methods for fertilizing a plant or increasing nitrogen uptake or increasing nitrogen utilization in the plant, are provided. In some embodiments, methods are provided for reducing an amount of at least one fertilizer required to be applied to a plant, to achieve a desired average growth parameter or yield. In some embodiments, a method can include applying to the soil or growth medium a water-soluble or water-miscible oil, wherein the oil comprises palmitoleic acid in an amount equal to or greater than 10% of the fatty acid content of the oil. In some embodiments, the oil further comprises oleic acid in an amount equal to or greater than 40% of the fatty acid content of the oil. In some embodiments, the palmitoleic acid can be present in an amount of from about 15% to about 22% of the fatty acid content of the oil. In some embodiments, the oleic acid can be present in an amount of from about 45% to about 70% of the fatty acid content of the oil. In some embodiments, palmitoleic acid and oleic acid can comprise more than 65% of the fatty acid content of the oil. In some embodiments, the water-soluble or water-miscible oil is selected from macadamia nut (seed) oil, mink oil, sea buckthorn oil, avocado oil, olive oil, ethoxylated forms thereof, as described herein, and combinations thereof. In some embodiments, the microbial (e.g. bacteria) can include one or more microbial (e.g., bacterial) strains native to the growth medium or soil. In some embodiments, the microbial (e.g., bacteria) can include one or more microbial (e.g., bacterial) strains non-native to the growth medium or soil, such as externally added, isolated microbia (e.g., bacteria) added as an agricultural active agent according to the methods and compositions described herein. In some embodiments, the methods can includ adding one or more non-native microbial (e.g., bacterial) strains to the growth medium or soil prior to or after application of the water-soluble or water-miscible oil.

In some embodiments, methods disclosed herein can include a step of testing a soil or growth medium for the presence of one or more target microbial (e.g., bacterial) strain (e.g., beneficial bacteria). Known methods can be used for testing the soil or growth medium for a target microbial (e.g., bacterial) strain. In some embodiments, depending on the test results, microbes (e.g., bacteria) may be added to the soil or growth medium. In some embodiments, sufficient concentrations of target microbes (e.g., bacteria) may already exist in the soil or growth medium, but be biologically unavailable to the plant. In some embodiments, microbes (e.g., bacteria) are not added to the soil or growth medium, but positive effects are still achieved, likely due to native microbes (e.g., bacteria) present in the soil or growth medium.

In some embodiments, methods disclosed herein can include a step of testing a soil or growth medium for the presence of one or more fertilizers, for example nitrogen, phosphorous, or potassium. Known methods can be used for testing the soil or growth medium for such fertilizer. In some embodiments, sufficient concentrations of a fertilizer, for example nitrogen, phosphorous or potassium, may already exist in the soil or growth medium, but be organically-bound and therefore biologically unavailable to the plant. In some embodiments, when a water-soluble oil is combined with microbia (e.g., bacteria) and is added to the soil or growth medium, mineralization takes place, whereby the such organically-bound fertilizer converts into an inorganic form and then becomes bioavailable to the plant.

The methods described herein are useful with any appropriate plant, plant part, or seed of interest, particularly any appropriate agriculture plant, plant part, or seed of interest. The methods can be used with any appropriate plant, plant part, or seed species including, without limitation, monocots, dicots, gymnosperms, or ferns. Examples of plant species on which the methods described herein can be applied include, but are not limited to, maize or corn (*Zea mays*), *Brassica* sp. (e.g., *B. napus, B. rapa,* or *B. juncea*), particularly those *Brassica* species useful as sources of seed oil, alfalfa (*Medicago sativa*), rice (*Oryza sativa*), rye (*Secale cereale*), sorghum (*Sorghum bicolor, Sorghum vulgare*), Sudangrass (*Sorghum bicolor* ssp. *drummondii*), millet (e.g., pearl millet (*Pennisetum glaucum*), proso millet (*Panicum miliaceum*), foxtail millet (*Setaria italica*), finger millet (*Eleusine coracana*), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatas*), cassava (*Manihot esculenta*), coffee (*Coffea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), hops (*Humulus lupulus*), oats, spices, herbs, edible flowers, algae, rapeseed, triticale, buckwheat, fonio, quinoa, or barley, or other fruits, vegetables, or ornamentals, or plants grown for aesthetic purposes, perennials, conifers, hemp, or marijuana.

Other plants of interest on which the methods described herein can be applied include, without limitation, vegetable plants, fruit tree plants, and berry bushes and vines including, but not limited to, tomatoes (*Lycopersicon esculentum*), lettuce (e.g., *Lactuca sativa*), green beans (*Phaseolus vulgaris*), lima beans (*Phaseolus limensis*), butter beans, kidney beans (*Phaseolus vulgaris*), yam beans, jicama, peas (*Lathyrus* spp.), cowpea (*Vigna unguiculata*), members of the genus *Cucumis* such as, for example, cucumber (*C. sativus*), cantaloupe (*C. cantalupensis*), musk melon (*C. melo*), or watermelon, beans, kale, spinach, peppers, artichoke, radish, potatoes, oranges, lemons, grapefruit, limes, fruit trees, fruit bushes such as, for example, blueberries, raspberries, blackberries, strawberries, or other berries, and grapes (e.g. *Vitus vinifera, V. labrusca, V. riparia, V. rotundifolia, V. rupestris, V. aestivalis,* or *Vitus* interspecific hybrids).

Ornamentals on which the methods described herein can be applied include, without limitation, azalea (*Rhododendron* spp.), hydrangea (*Macrophylla hydrangea*), hibiscus (*Hibiscus rosasanensis*), rose (*Rosa* spp.), tulip (*Tulipa* spp.), daffodil (*Narcissus* spp.), petunia (*Petunia* x *atkinsiana*, synonym: *Petunia* x hybrid; *Petunia nana; Petunia* spp.), pansy (*Viola tricolor; Viola* x *wittrockiana; Viola* spp.) carnation (*Dianthus caryophyllus*), poinsettia (*Euphorbia pulcherrima*), or chrysanthemum.

Perennials on which the methods described herein can be applied include, without limitation, balloon flower (*Platycodon grandiflorus*), black-eyed Susan (*Rudbeckia fulgida* var. *sullivantii*), bleeding-heart (*Dicentra spectabilis*), butterfly-weed (*Asclepias tuberosa*), daylily (*Hemerocallis* spp.), iris (*Iris* spp.), lilly (*Lilly* spp.), lavender (*Lavendula angustifolia*), lily-of the-alley (*Convallaria majalis*), peony (*Paeonia Iactiflora*), coneflower (*Echinacea* spp.), or Shasta daisy (*Leucanthemum* x *superbum*).

Conifers on which the methods described herein can be applied include, without limitation, pines such as loblolly pine (*Pinus taeda*), slash pine (*Pinus elliotii*), ponderosa pine (*Pinus ponderosa*), lodgepole pine (*Pinus contorta*), Virginia pine (*Pinus virginiana*), white pine (*Pinus strobus*), or Monterey pine (*Pinus radiata*); Douglas fir (*Pseudotsuga menziesii*); Western hemlock (*Tsuga canadensis*); Sitka spruce (*Picea glauca*); or redwood (*Sequoia sempervirens*); true firs such as silver fir (*Abies amabilis*), balsam fir (*Abies balsamea*), or Frasier fir (*Abies fraseri*); or cedars such as Western red cedar (*Thuja plicata*) or Alaska yellow-cedar (*Chamaecyparis nootkatensis*).

Cannabis, marijuana or hemp, on which the methods described herein can be applied include, without limitation, all cannabis varieties whether sativa, indica, ruderalis, or hybrid strains.

The methods described herein also can be practiced on species of grasses, including, without limitation, turfgrasses used for pastures, meadows, farms, lawns, parks, recreational areas, golf courses, golf fairways, golf greens, golf driving ranges, horse tracks, tennis courts, cemeteries, or athletic fields used for sports such as, for example, American football, soccer, baseball, softball, cricket, rugby, or polo. Turfgrasses are typically characterized as cool-season turfgrasses or warm-season turfgrasses. Examples of cool-season turfgrasses that can be used in the methods described herein include, without limitation, bluegrasses (*Poa* spp.), such as Kentucky bluegrass (*Poa pratensis*), rough bluegrass (*Poa trivialis*), Canada bluegrass (*Poa compressa*), annual bluegrass (*Poa annua*), upland bluegrass (*Poa glaucantha*), wood bluegrass (*Poa nemoralis*), or bulbous bluegrass (*Poa bulbosa*); the bentgrasses or redtop (*Agrostis* spp.), such as creeping bentgrass (*Agrostis palustris*), colonial bentgrass (*Agrostis tenuis*), velvet bentgrass (*Agrostis canina*), South German Mixed Bentgrass (*Agrostis* spp. including *Agrostis tenius, Agrostis canina,* or *Agrostis palustris*), or redtop (*Agrostis alba*); the fescues (*Festuca* spp.), such as red fescue (*Festuca rubra; Festuca rubra* var. *rubra*), chewings fescue (*Festuca rubra commutata.*), sheep fescue (*Festuca ovina*), hard fescue (*Festuca longifolia*), hair fescue (*Festuca capillata*), tall fescue (*Festuca arundinacea*), or meadow fescue (*Festuca elanor*); the ryegrasses (*Lolium* spp.), such as annual ryegrass (*Lolium multiflorum*), perennial ryegrass (*Lolium perenne*), or italian ryegrass (*Lolium multiflorum*); or the wheatgrasses (*Agropyron* spp.), such as fairway wheatgrass (*Agropyron crista-*

*tum*), crested wheatgrass (*Agropyron desertorum*), or western wheatgrass (*Agropyron smithii*). Other cool-season turfgrasses on which the methods described herein can be applied include, without limitation, beachgrass (*Ammophila breviligulata*), smooth bromegrass (*Bromus inermis*), cattails such as Timothy (*Phleum pratense*), sand cattail (*Phleum subulatum*), orchardgrass (*Dactylis glomerata*), weeping alkaligrass (*Puccinellia distans*) or crested dog's-tail (*Cynosurus cristatus*). Examples of warm-season turfgrasses on which the methods described herein can be applied include, without limitation, Bermudagrass (*Cynodon* spp.), zoysiagrass (*Zoysia* spp.), St. Augustine grass (*Stenotaphrum secundatum*), centipedegrass (*Eremochloa ophiuroides*), carpetgrass (*Axonopus affinis*), Bahia grass (*Paspalum notatum*), Kikuyugrass (*Pennisetum clandestinum*), buffalo grass (*Buchloe dactyloids*), Blue gramma (*Bouteloua gracilis*), seashore paspalum (*Paspalum vaginatum*) or sideoats grama (*Bouteloua curtipendula*).

In some cases, the methods provided herein can be used with turfgrass lawns, stands, sod, or other plantings comprising a single turfgrass species or a mixture of two, three, four, or more turfgrass species, including, without limitation, a mixture of two, three, four, or more of the aforementioned turfgrass species.

In some cases, plants on which the methods described herein can be applied include crop plants, plant parts, or seeds. Examples of crop plants on which the methods described herein can be applied include, without limitation, grain plants (e.g., maize, wheat, rice, oat, barley, rye, or millet) or oilseed plants (e.g., oil palm, coconut, olive, soybean, canola, sunflower, safflower, cotton, peanut, sesame, or flax), forage plants (e.g., alfalfa), fiber plants (e.g., cotton, flax), fruit trees (e.g., apple, pear, peach, plum, cherry, orange, grapefruit, lemon, lime, or avocado), nut trees (e.g., almond, cashew, English walnut, pecan, pistachio, or hazelnut), berries (e.g., strawberry, raspberry, blackberry, blueberry, cranberry, grape, or lingonberry), sugarcane, sugar beets, or vegetable plants (e.g., lettuce, potato, tomato, pepper, eggplant, sweet potato, cassava, squash, pumpkin, onion, carrot, celery, cabbage, cauliflower, broccoli, or garden beet). Such nonsolanaceous crop plants on which the methods described herein can be applied include, without limitation, cotton, soybean, maize, wheat, rice, oat, barley, sorghum, cabbage, cauliflower, broccoli, sweet potato, lettuce, apple, citrus, strawberry, banana, sugarcane, or palm. Other plants on which the methods described herein can be applied are forage plants, fruit trees, nut trees, turfgrasses, houseplants, bedding plants, or landscape plants.

In certain embodiments, the plants, plant parts, or seeds on which the methods described herein can be applied include ones in which a part or parts of the plant, plant part, or seed are sold commercially including, without limitation, Christmas trees, seedlings, bulbs or flowers (e.g., roses, carnations, poinsettias, daisies, daffodils, tulips, or chrysanthemums). It is recognized that for such plants, the composition can be contacted with the intact plant or soil surrounding the plant before the desired part or parts are harvested. Alternatively or additionally, the desired part or parts can be contacted with a composition provided herein after harvest by any of the methods of contacting described herein. In certain embodiments, the cut end of a Christmas tree, or the cut end of a flower stalk or pedicle to which the cut flower is attached, can be immersed in a liquid or bead composition provided herein.

In some embodiments, a plant, plant part, or seed treated as described herein can be a plant, plant part, or seed that is growing in a pot outdoors at a plant nursery or in a greenhouse or other controlled environment, or a plant growth facility indoors. In some embodiments, a composition provided herein is applied to the growth medium of the pot in which the plant, plant part, or seed is growing. The methods described herein do not depend on a particular growth medium. Any appropriate growth medium can be used in the methods disclosed herein including, without limitation, soil, biochar, growth media comprising soil and other non-soil components, and soil-free growth media that comprise non-soil components but do not contain soil. Such non-soil components include, without limitation, shredded bark, bark chips, particles or fines, peat moss, vermiculite, perlite, expanded slate lightweight aggregate, agar, and sand.

In some embodiments, a plant, plant part, or seed treated as described herein can be a plant, plant part, or seed that is grown hydroponically, and a composition described herein is applied to the plant, plant part, or seed in the same manner as a nutrient solution known in the art. In some cases, the composition comprises the water-soluble oil, water and all or a portion of the nutrients and other components in the nutrient solution used for growing the plants, plant parts, or seeds hydroponically. The composition can replace, in whole or in part for example, the nutrient solution entirely during the period the plant, plant part, or seed is grown under hydroponic conditions or on occasion for a certain period of time, or on multiple occasions, each for a certain period of time.

The methods described herein can include contacting a plant, plant part, or seed with a composition described herein. As used herein, the term "contacting" is not intended to limit the methods to a single application of the composition to the plant, plant part, or seed or to the soil or other growth medium in the vicinity of the plant, plant part, or seed. The "contacting" can comprise, for example, a single application, or multiple applications or continuous application as in the case of a plant, plant part, or seed grown in a hydroponic culture. Thus, a composition provided herein can be applied to a plant, plant part, or seed 1, 2, 3, 4, 5, 6, 7, 8, 9, 10 or more times during a growing season, the plant's life cycle, or within a range defined by any two of the aforementioned times. For example, a composition provided herein can be applied to a plant, plant part, or seed from about 1 to about 1,000 times during one growing season.

The methods described herein can include contacting soil, a soil amendment, biochar, or a growth medium with a composition described herein. A composition provided herein can be applied to soil, a soil amendment, biochar, or a growth medium 1, 2, 3, 4, 5, 6, 7, 8, 9, 10 or more times during a growing season, a plant's life cycle, or within a range defined by any two of the aforementioned times. For example, a composition provided herein can be applied to soil, a soil amendment, biochar, or a growth medium from about 1 to about 1,000 times during one growing season.

In some cases, a composition provided herein can be incorporated into, or used directly as, a composition for coating seeds, such as in seed treatments. In some embodiments, seed treatments can be applied directly to a naked or untreated seed. In some embodiments, seed treatments can be applied over an existing seed coating or treatments that have already been coated onto the seed.

In some embodiments, a composition provided herein can be applied to a particular plant, plant part, or seed or target area in one or more applications as needed. In some embodiments, a composition provided herein can be applied to the plants, plant parts, or seeds, in one or more applications, to form a treated plant, treated plant part, or treated seed.

EXAMPLES

Example 1: Production of Concentrated Aqueous Solutions

Compositions comprising 0.1% w/w Urea were prepared in water and initial stability achieved.

Compositions comprising 0.1% w/w Urea and 5% w/w PEG-16 Macadamia Glycerides were prepared in water and initial stability achieved.

Compositions comprising 0.1% w/w Urea and 0.6% w/w Polyalkylene Oxide Block Copolymer (commercial name: Synperonic PE/L64) were prepared in water and initial stability achieved.

Compositions comprising 0.1% w/w Urea, 5% w/w PEG-16 Macadamia Glycerides and 0.6% w/w Polyalkylene Oxide Block Copolymer (Synperonic PE/L64) were prepared in water and initial stability achieved.

Example 2: Commercial Application

The present invention described herein is designed to be applied to a field, farm or growing facility, for example, to lettuce, processed tomatoes, or strawberries, using conventional agricultural chemical application practices. First, a water-soluble oil selected from the group consisting of ethoxylated macadamia oil (e.g., seed oil), ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil (e.g., fruit, berry or seed oil), ethoxylated emu oil, ethoxylated mink oil, PEG Glyceryl Dimyristate, PEG Glyceryl Dioleate, PEG Glyceryl Distearate, and PEG Glyceryl Palmitate and combinations thereof is combined with one or more agricultural active agents selected from the group consisting of a fertilizer, pesticide, microbe (e.g., bacteria, fungi, yeast, etc.), insecticide, acaricide, nematicide, fungicide, biofungicde, bactericide, herbicide, plant growth regulator, biostimulant, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, a colorant, and combinations thereof, and a carrier(s) (e.g., water). Second, such water-soluble oil, agricultural active agent(s) and carrier(s) composition is formulated at less than the agricultural active ingredient(s) label rate of a conventional composition comprising the same agricultural active agent(s) and carrier(s), but not containing a water-soluble oil. Finally, third, such water-soluble oil, agricultural active agent(s) and carrier(s) composition is then applied to a plant, plant part, soil, growth medium, or seed using conventional agricultural chemical application equipment, techniques and practices known in the art and/or described herein. In one embodiment of the compositions herein, such water-soluble oil, agricultural active agent(s) (e.g., Nitrogen) and carrier(s) composition is applied to lettuce at less than the published University of California Nitrogen rate guideline of 170 to 220 pounds per acre. In another embodiment of the compositions herein, such water-soluble oil, agricultural active agent(s) (e.g., Nitrogen) and carrier(s) composition is applied to processed tomatoes at less than the published University of California Nitrogen rate guideline of 100 to 150 pounds per acre. In another embodiment of the compositions herein, such water-soluble oil, agricultural active agent(s) (e.g., Nitrogen) and carrier(s) composition is applied to strawberries at less than the published University of California Nitrogen rate guideline of 150 to 300 pounds per acre.

OTHER EMBODIMENTS

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following exemplary embodiments and claims.

Exemplary Embodiments

Embodiment 1

A composition comprising:
one or more water-soluble oils selected from the group consisting of ethoxylated macadamia oil, ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil, ethoxylated emu oil, ethoxylated mink oil, PEG Glyceryl Dimyristate, PEG Glyceryl Dioleate, PEG Glyceryl Distearate, and PEG Glyceryl Palmitate; and
one or more agricultural chemicals biological agents selected from the group consisting of a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, and colorant.

Embodiment 2

The composition of embodiment 1, wherein the composition further comprises water.

Embodiment 3

The composition of any one of embodiments 1-2, wherein the one or more water-soluble oils contain an average of between about 5 and about 75 ethoxylations per molecule.

Embodiment 4

The composition of any one of embodiments 1-3, wherein the composition comprises ethoxylated macadamia oil.

Embodiment 5

The composition of embodiment 4, wherein the ethoxylated macadamia oil contains an average of between about 10 and about 19 ethoxylations per molecule.

Embodiment 6

The composition of embodiment 4, wherein the ethoxylated macadamia oil contains an average of about 16 ethoxylations per molecule.

Embodiment 7

The composition of any one of embodiments 1-3, wherein the composition comprises an ethoxylated olive oil having an average of about 10 ethoxylations per molecule.

Embodiment 8

The composition of any one of embodiments 1-3, wherein the composition comprises an ethoxylated avocado oil having an average of about 11 ethoxylations per molecule.

Embodiment 9

The composition of any one of embodiments 1-3, wherein the composition comprises an ethoxylated meadowfoam oil having an average of about 75 ethoxylations per molecule.

Embodiment 10

The composition of any one of embodiments 1-3, wherein the composition comprises an ethoxylated almond oil having an average of about 20 ethoxylations per molecule.

Embodiment 11

The composition of any one of embodiments 1-3, wherein the composition comprises an ethoxylated, corn oil having an average of about 5 ethoxylations per molecule.

Embodiment 12

The composition of any one of embodiments 1-3, wherein the composition comprises an ethoxylated soybean oil having an average of about 35 ethoxylations per molecule.

Embodiment 13

The composition of any one of embodiments 1-3, wherein the composition comprises an ethoxylated mink oil having an average of about 13 ethoxylations per molecule.

Embodiment 14

The composition of any one of embodiments 1-13, wherein the composition further comprises a wetting agent.

Embodiment 15

The composition of any one of embodiments 1-14, wherein the composition further comprises a water-soluble agrochemical oil.

Embodiment 16

The composition of any one of embodiments 1-15, wherein the agricultural chemical or biological agent is a pesticide selected from an herbicide, an herbicide safener, an insecticide, a fungicide, biofungicide, an algicide, a bactericide, and a virucide.

Embodiment 17

The composition of any one of embodiments 1-16, wherein the agricultural chemical or biological agent is a glyphosate or glyphosate salt.

Embodiment 18

The composition of any one of embodiments 1-15, wherein the agricultural chemical or biological agent is a fertilizer.

Embodiment 19

A method of increasing the effectiveness of an agricultural chemical or biological agent on a plant, plant part, or seed, comprising: contacting the plant, plant part, or seed with:
one or more water-soluble oils selected from the group consisting of ethoxylated macadamia oil, ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil, ethoxylated emu oil, ethoxylated mink oil, PEG Glyceryl Dimyristate, PEG Glyceryl Dioleate, PEG Glyceryl Distearate, and PEG Glyceryl Palmitate; and
one or more agricultural chemicals or biological agents selected from the group consisting of a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, and colorant, wherein the plant, plant part, or seed displays increased effectiveness of the agricultural chemical or biological agent as compared to a plant, plant part, or seed that was contacted with the agricultural chemical or biological agent without the one or more water-soluble oils.

Embodiment 20

The method of embodiment 19, wherein contacting the plant, plant part, or seed comprises separately contacting the plant, plant part, or seed with the one or more water-soluble oils and the one or more agricultural chemical or biological agents.

Embodiment 21

The method of embodiment 19, wherein contacting the plant, plant part, or seed comprises simultaneously contacting the plant, plant part, or seed with the one or more water-soluble oils and the one or more agricultural chemical or biological agents.

Embodiment 22

The method of embodiment 19, wherein contacting the plant, plant part, or seed comprises contacting the plant, plant part, or seed with a composition of any one of embodiments 1-18.

Embodiment 23

The method of any one of embodiments 20-21, wherein contacting the plant, plant part, or seed comprises applying the one or more water-soluble oils and the one or more agricultural chemical or biological agents to the soil or growth medium in the vicinity of the plant, plant part, or seed.

Embodiment 24

The method of embodiment 22, wherein contacting the plant, plant part, or seed comprises applying the composition to the soil or growth medium in the vicinity of the plant, plant part, or seed.

Embodiment 25

The method of any one of embodiments 20-21, wherein contacting the plant, plant part, or seed comprises applying the one or more water-soluble oils and the one or more agricultural chemical or biological agents to a plant or plant part by foliar, drip, in-furrow, or drench application.

Embodiment 26

The method of embodiment 22, wherein contacting the plant, plant part, or seed comprises applying the composition to a plant or plant part by foliar, drip, in-furrow, or drench application.

Embodiment 27

A method of increasing the absorption of an agricultural chemical or biological agent into a plant, plant part, or seed, comprising: contacting the plant, plant part, or seed with:
  one or more water-soluble oils selected from the group consisting of ethoxylated macadamia oil, ethoxylated olive oil, ethoxylated avocado oil, ethoxylated meadowfoam oil, ethoxylated almond oil, ethoxylated corn oil, ethoxylated soybean oil, ethoxylated jojoba oil, ethoxylated seabuckthorn oil, ethoxylated emu oil, ethoxylated mink oil, PEG Glyceryl Dimyristate, PEG Glyceryl Dioleate, PEG Glyceryl Distearate, and PEG Glyceryl Palmitate; and
  one or more agricultural chemical or biological agents selected from the group consisting of a fertilizer, pesticide, insecticide, acaricide, nematicide, fungicide, biofungicide, bactericide, herbicide, plant growth regulator, biostimulant, bacteria, fungi, yeast, virus, nutrient, drift reduction agent, water conditioner, penetrant, pH buffer, activator, surfactant, stabilizer, preservative, spreader, wetting agent, detergent, adhesive, anticaking agent, dye, dispersant, emulsifying agent, defoamer, antimicrobial, antifreeze, pigment, and colorant,
  wherein the plant, plant part, or seed displays increased absorption of the agricultural chemical or biological agent as compared to a plant, plant part, or seed that was contacted with the same agricultural chemicals or biological agent without the one or more water-soluble oils.

Embodiment 28

The method of embodiment 27, wherein contacting the plant, plant part, or seed comprises separately contacting the plant, plant part, or seed with the one or more water-soluble oils and the one or more agricultural chemicals or biological agents.

Embodiment 29

The method of embodiment 27, wherein contacting the plant, plant part, or seed comprises simultaneously contacting the plant, plant part, or seed with the one or more water-soluble oils and the one or more agricultural chemicals or biological agents.

Embodiment 30

The method of embodiment 27, wherein contacting the plant, plant part, or seed comprises contacting the plant, plant part, or seed with a composition of any one of embodiments 1-18.

Embodiment 31

The method of any one of embodiments 28-29, wherein contacting the plant, plant part, or seed comprises applying the one or more water-soluble oils and the one or more agricultural chemicals or biological agents to the soil or growth medium in the vicinity of the plant, plant part, or seed.

Embodiment 32

The method of embodiment 30, wherein contacting the plant, plant part, or seed comprises applying the composition to the soil or growth medium in the vicinity of the plant, plant part, or seed.

Embodiment 33

The method of any one of embodiments 28-29, wherein contacting the plant, plant part, or seed comprises applying the one or more water-soluble oils and the one or more agricultural chemicals or biological agents to a plant or plant part by foliar application.

Embodiment 34

The method of embodiment 30, wherein contacting the plant, plant part, or seed comprises applying the composition to a plant or plant part by foliar, drip, in-furrow, or drench application.

Embodiment 35

A method of treating a plant, plant part, or seed, comprising: contacting the plant, plant part, or seed with an effective amount of a composition of any one of embodiments 1-18, 44-47, or 49-65.

Embodiment 36

The method of embodiment 35, wherein contacting the plant, plant part, or seed comprises applying the composition to the soil or growth medium in the vicinity of the plant, plant part, or seed.

Embodiment 37

The method of embodiment 35, wherein contacting the plant, plant part, or seed comprises applying the composition to a plant or plant part by foliar, drip, or drench application.

Embodiment 38

A method of treating a seed, comprising:
  coating a seed with an effective amount of a composition of any one of embodiments 1-18, 44-47, or 49-65.

Embodiment 39

A method of making a composition of any one of embodiments 1-18, 44-47, or 49-65, comprising:
adding the one or more water-soluble oils and the one or more agricultural chemicals or biological agents to water; and mixing the composition to form a homogenous solution.

Embodiment 40

A method of reducing the application concentration, application rate, or application frequency of an agricultural chemical or biological agent to a plant, plant part, or seed, comprising:
contacting the plant, plant part, or seed with a composition of any one of embodiments 1-18, 44-47, or 49-65, wherein the plant displays an equivalent response to the agricultural chemical or biological agent as compared to a plant, plant part, or seed that was contacted with the same or higher concentration of the same agricultural chemical or biological agent without the one or more water-soluble oils.

Embodiment 41

A method of reducing the application concentration, application rate, or application frequency of an agricultural chemical or biological agent to a plant, plant part, or seed, comprising:
contacting the plant, plant part, or seed with a composition of any one of embodiments 1-18, 44-47, or 49-65, wherein the plant displays an enhanced effective response to the agricultural chemical or biological agent as compared to a plant, plant part, or seed that was contacted with the same or higher concentration of the same agricultural chemical or biological agent without the one or more water-soluble oils.

Embodiment 42

A method of treating a soil or growth medium, comprising contacting the soil or growth medium with an effective amount of a composition of any one of embodiments 1-18, 44-47, or 49-65.

Embodiment 43

The method of embodiment 42 comprising applying the composition to the soil or growth medium.

Embodiment 44

The composition of any one of embodiments 1-3, wherein the composition comprises an ethoxylated jojoba oil.

Embodiment 45

The composition of any one of embodiments 1-3, wherein the composition comprises an ethoxylated seabuckthorn fruit or berry oil.

Embodiment 46

The composition of any one of embodiments 1-3, wherein the composition comprises an ethoxylated seabuckthorn seed oil.

Embodiment 47

The composition of any one of embodiments 1-3, wherein the composition comprises an ethoxylated emu oil.

Embodiment 48

A method of maintaining an equivalent application concentration, application rate, and/or application frequency of an agricultural chemical or biological agent to a plant, plant part, or seed, comprising:
contacting the plant, plant part, or seed with a composition of any one of embodiments 1-18, 44-47, or 49-65, wherein the plant displays an enhanced effective response to the agricultural chemical or biological agent as compared to a plant, plant part, or seed that was contacted with the same concentration of the same agricultural chemical or biological agent without the one or more water-soluble oils.

Embodiment 49

The composition of any one of embodiments 1-16 or 44-47, wherein the pesticide is a biopesticide.

Embodiment 50

The composition of embodiment 49, wherein the biopesticide is one or more strains of microbes.

Embodiment 51

The composition of any one of embodiments 1-18 or 44-47, wherein the agricultural active agent comprises one or more strains of microbes.

Embodiment 52

The composition of embodiment 51, wherein the microbes act as a biopesticide, a plant growth regulator, a biostimulant, a fertilizer, or a combination thereof.

Embodiment 53

The composition of any one of embodiments 50-52, wherein the microbes comprise gram positive bacteria, gram negative bacteria, or a combination thereof.

Embodiment 54

The composition of any one of embodiments 50-53, wherein the microbes are selected from *Azotobacter vinelandii, Bacillis, Diazotrophic, Rhizobia, Bradyrhizobium japonicum, Klebsiella pneumoniae, Sinorhizobium meliloti, Enterobacter cloacae, Citrobacter freundii, Comamonas testosterone, Pseudomonas putida*, and combinations thereof.

Embodiment 55

The composition of any one of embodiments 50-54, wherein the microbes are present at a concentration of from about $10^5$ to about $10^{15}$ CFU/ml.

Embodiment 56

The composition of any one of embodiments 50-54, wherein the microbes are present at a concentration of from about $10^8$ to about $10^{10}$ CFU/ml.

Embodiment 57

The composition of any one of embodiments 50-56, further comprising a nitrogen source, a phosphorous source, a potassium source, or a combination thereof.

Embodiment 58

The composition of embodiment 57, wherein the nitrogen source provides nitrogen at a concentration that is less than a traditional fertilizing concentration.

Embodiment 59

The composition of embodiment 57, wherein the nitrogen source provides nitrogen at a concentration is 95% or less of a traditional fertilizing concentration for the particular plant species, type, use, and/or growing conditions.

Embodiment 60

The composition of any one of embodiments 57-59, wherein the phosphorous source provides phosphorous at a concentration that is less than a traditional fertilizing concentration.

Embodiment 61

The composition of any one of embodiments 57-59, wherein the phosphorous source provides phosphorous at a concentration that is 95% or less of a traditional fertilizing concentration for the particular plant species, type, use, and/or growing conditions.

Embodiment 62

The composition of embodiment 18, wherein the fertilizer is present at a concentration that is less than a traditional fertilizing concentration.

Embodiment 63

The composition of embodiment 62, wherein the fertilizer is selected from the group consisting of a nitrogen source, a phosphorous source, a potassium source, or a combination thereof.

Embodiment 64

The composition of embodiment 63, wherein the nitrogen source provides nitrogen at a concentration that is 95% or less of a traditional fertilizing concentration for the particular plant species, type, use, and/or growing conditions.

Embodiment 65

The composition of any one of embodiments 63-64, wherein the phosphorous source provides phosphorous at a concentration that is 95% or less of a traditional fertilizing concentration for the particular plant species, type, use, and/or growing conditions.

Embodiment 66

The method of any one of embodiments 19-26, wherein the agricultural chemical or biological agent is a fertilizer.

Embodiment 67

The method of embodiment 66, wherein the fertilizer is present at a concentration that is less than a traditional fertilizing concentration.

Embodiment 68

The method of embodiment 67, wherein the fertilizer is selected from the group consisting of a nitrogen source, a phosphorous source, a potassium source, or a combination thereof.

Embodiment 69

The method of embodiment 68, wherein the nitrogen source provides nitrogen at a concentration that is 95% or less of a traditional fertilizing to concentration for the particular plant species, type, use, and/or growing conditions.

Embodiment 70

The method of any one of embodiments 68-69, wherein the phosphorous source provides phosphorous at a concentration that is 95% or less of a traditional fertilizing concentration for the particular plant species, type, use, and/or growing conditions.

Embodiment 71

The method of embodiment 40, wherein the agricultural chemical or biological agent is a fertilizer.

Embodiment 72

The method of embodiment 71, wherein the fertilizer is present at a concentration that is less than a traditional fertilizing concentration.

Embodiment 73

The method of embodiment 72, wherein the fertilizer is selected from the group consisting of a nitrogen source, a phosphorous source, a potassium source, or a combination thereof.

Embodiment 74

The method of embodiment 73, wherein the nitrogen source provides nitrogen at a concentration that is 95% or less of a traditional fertilizing concentration for the particular plant species, type, use, and/or growing conditions.

Embodiment 75

The method of any one of embodiments 73-74, wherein the phosphorous source provides phosphorous at a concentration that is 95% or less of a traditional fertilizing concentration for the particular plant species, type, use, and/or growing conditions.

Embodiment 76

A method of increasing microbial biomass or bacteria in a soil or plant growth medium, comprising:
applying to the soil or growth medium a water-soluble or water-miscible oil, wherein the oil comprises palmitoleic acid in an amount equal to or greater than 10% of the fatty acid content of the oil.

Embodiment 77

The method of embodiment 76, wherein the oil further comprises oleic acid in an amount equal to or greater than 40% of the fatty acid content of the oil.

Embodiment 78

The method of any one of embodiments 76-77, wherein the palmitoleic acid is present in an amount of from about 15% to about 22% of the fatty acid content of the oil.

Embodiment 79

The method of any one of embodiments 76-78, wherein the oleic acid is present in an amount of from about 5% to about 70% of the fatty acid content of the oil.

Embodiment 80

The method of any one of embodiments 76-79, wherein palmitoleic acid and oleic acid comprise greater than 55% of the fatty acid content of the oil.

Embodiment 81

The method of any one of embodiments 76-80, wherein the water-soluble or water-miscible oil is selected from macadamia nut oil, mink oil, sea buckthorn oil, avocado oil, olive oil, and combinations thereof.

Embodiment 82

The method of any one of embodiments 76-80, wherein the water-soluble or water-miscible oil is macadamia nut oil.

Embodiment 83

The method of embodiment 82, wherein the macadamia nut oil is macadamia nut oil with 16 ethoxylations per molecule.

Embodiment 84

The method of any one of embodiments 76-83, wherein the microbes comprise one or more microbial strains native to the growth medium or soil.

Embodiment 85

The method of any one of embodiments 76-83, wherein the microbes comprise one or more microbial strains non-native to the growth medium or soil.

Embodiment 86

The method of any one of embodiments 76-85, further comprising testing the growth medium or soil for the presence of a desired microbial strain.

Embodiment 87

The method of any one of embodiments 76-86, further comprising adding one or more non-native microbial strains to the growth medium or soil prior to or after application of the water-soluble or water-miscible oil.

Embodiment 88

A method of fertilizing a plant or increasing nitrogen uptake in the plant, comprising:
applying to a soil or growth medium in the vicinity of the plant a water-soluble or water-miscible oil, wherein the oil comprises palmitoleic acid in an amount equal to or greater than 10% of the fatty acid content of the oil.

Embodiment 89

The method of embodiment 88, wherein the oil further comprises oleic acid in an amount equal to or greater than 40% of the fatty acid content of the oil.

Embodiment 90

The method of any one of embodiments 88-89, wherein the palmitoleic acid is present in an amount of from about 15% to about 22% of the fatty acid content of the oil.

Embodiment 91

The method of any one of embodiments 88-90, wherein the oleic acid is present in an amount of from about 5% to about 70% of the fatty acid content of the oil.

Embodiment 92

The method of any one of embodiments 88-91, wherein palmitoleic acid and oleic acid comprise greater than 55% of the fatty acid content of the oil.

Embodiment 93

The method of any one of embodiments 88-92, wherein the water-soluble or water-miscible oil is selected from macadamia nut oil, mink oil, sea buckthorn oil, avocado oil, olive oil, and combinations thereof.

Embodiment 94

The method of any one of embodiments 88-92, wherein the water-soluble or water-miscible oil is macadamia nut oil.

Embodiment 95

The method of embodiment 94, wherein the macadamia nut oil is macadamia nut oil with 16 ethoxylations per molecule.

Embodiment 96

The method of any one of embodiments 88-95, further comprising adding one or more microbial strains to the growth medium or soil prior to, at the same time, or after application of the water-soluble or water-miscible oil.

Embodiment 97

The method of embodiment 96, wherein the microbial strains are selected from *Azotobacter vinelandii, Bacillis,*

*Diazotrophic, Rhizobia, Bradyrhizobium japonicum, Klebsiella pneumoniae, Sinorhizobium meliloti, Enterobacter cloacae, Citrobacter freundii, Comamonas testosterone, Pseudomonas putida,* and combinations thereof.

Embodiment 98

The method of any one of embodiments 88-97, wherein the method does not include providing added nitrogen or an added nitrogen source to the soil, growth medium, plant, plant part, or seed.

Embodiment 99

A method of reducing an amount of at least one fertilizer required to be applied to a plant, comprising:
applying to a soil or growth medium in the vicinity of the plant a water-soluble or water-miscible oil, wherein the oil comprises palmitoleic acid in an amount equal to or greater than 10% of the fatty acid content of the oil, and wherein the amount of fertilizer required to be applied to the plant to achieve a desired average growth parameter is reduced when compared to a control plant growing in similar growth conditions that has not been contacted with the water-soluble or water-miscible oil.

Embodiment 100

The method of embodiment 99, further comprising applying an effective amount of one or more microbial strains to the soil or growth medium.

Embodiment 101

The method of embodiment 100, wherein the bacterial strains are selected from *Azotobacter vinelandii, Bacillis, Diazotrophic, Rhizobia, Bradyrhizobium japonicum, Klebsiella pneumoniae, Sinorhizobium meliloti, Enterobacter cloacae, Citrobacter freundii, Comamonas testosterone, Pseudomonas putida,* and combinations thereof.

Embodiment 102

The method of any one of embodiments 99-101, further comprising applying at least one agricultural chemical or biological agent to the plant.

Embodiment 103

The method of embodiment 102, wherein the agricultural chemical or biological agent is at least one fertilizer.

Embodiment 104

The method of embodiment 103, wherein the fertilizer is applied at a concentration that is from about 5% to about 95% of the amount of the traditional fertilizing concentration applied for fertilization purposes to a similar or control plant growing in similar growth conditions.

Embodiment 105

The method of any one of embodiments 103-104, wherein the fertilizer is nitrogen or a nitrogen source.

Embodiment 106

The method of any one of embodiments 103-105, wherein the plant does not, during any stage of growth, receive an application of the at least one fertilizer at a traditional fertilizing concentration applied for fertilization purposes to a similar or control plant growing in similar growth conditions.

Embodiment 107

The method of any one of embodiments 99-106, wherein the water-soluble or water-miscible oil is selected from macadamia nut oil, mink oil, sea buckthorn oil, avocado oil, olive oil, and combinations thereof.

Embodiment 108

The method of embodiment 107, wherein the water-soluble or water-miscible oil is macadamia nut oil.

Embodiment 109

The method of embodiment 108, wherein the macadamia nut oil is macadamia nut oil with 16 ethoxylations per molecule.

Embodiment 110

The composition of any one of embodiments 57-69, wherein the potassium source provides potassium at a concentration that is 95% or less of a traditional fertilizing concentration for the particular plant species, type, use, and/or growing conditions.

Embodiment 111

The composition of any one of embodiments 63-65, wherein the potassium source provides potassium at a concentration that is 95% or less of a traditional fertilizing concentration for the particular plant species, type, use, and/or growing conditions.

Embodiment 112

The method of any one of embodiments 68-70, wherein the potassium source provides potassium at a concentration that is 95% or less of a traditional fertilizing concentration for the particular plant species, type, use, and/or growing conditions.

Embodiment 113

The method of any one of embodiments 73-75, wherein the potassium source provides potassium at a concentration that is 95% or less of a traditional fertilizing concentration for the particular plant species, type, use, and/or growing conditions.

What is claimed is:
1. A method of increasing microbial biomass or bacteria in a soil or plant growth medium, comprising:
applying to the soil or growth medium a water-soluble or water-miscible oil, wherein the oil comprises palmitoleic acid in an amount equal to or greater than 10% of the fatty acid content of the oil.
2. The method of claim 1, wherein the water-soluble oil is ethoxylated macadamia oil.
3. The method of claim 2, wherein the ethoxylated macadamia oil contains an average of between about 10 and about 19 ethoxylations per molecule.

4. The method of claim 2, wherein the ethoxylated macadamia oil contains an average of about 16 ethoxylations per molecule.

5. The method of claim 1, wherein the water-soluble or water-miscible oil is macadamia nut oil.

6. The method of claim 5, wherein the macadamia nut oil is macadamia nut oil with 16 ethoxylations per molecule.

7. The method of claim 1, wherein the oil further comprises oleic acid in an amount equal to or greater than 40% of the fatty acid content of the oil.

8. The method of claim 1, wherein the palmitoleic acid is present in an amount of from about 15% to about 22% of the fatty acid content of the oil.

9. The method of claim 1, wherein the water-soluble or water-miscible oil is selected from the group consisting of macadamia nut oil, mink oil, sea buckthorn oil, avocado oil, olive oil, and combinations thereof.

* * * * *